(12) United States Patent
Roman et al.

(10) Patent No.: US 11,305,491 B2
(45) Date of Patent: *Apr. 19, 2022

(54) THREE-DIMENSIONAL (3D) OBJECT PRINTING BASED ON A BUILD MATERIAL, MOISTURE CONTENT LEVEL

(71) Applicant: HEWLETT-PACKARD DEVELOPMENT COMPANY, L.P., Spring, TX (US)

(72) Inventors: Justin M. Roman, Vancouver, WA (US); Luke Sosnowski, Vancouver, WA (US); David Soriano, Vancouver, WA (US); Emiliano Gabriel Tolosa Gonzalez, Sant Cugat del Valles (ES)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/607,752

(22) PCT Filed: Apr. 6, 2018

(86) PCT No.: PCT/US2018/026523
§ 371 (c)(1),
(2) Date: Oct. 24, 2019

(87) PCT Pub. No.: WO2019/194823
PCT Pub. Date: Oct. 10, 2019

(65) Prior Publication Data
US 2021/0069987 A1 Mar. 11, 2021

(51) Int. Cl.
*B29C 64/393* (2017.01)
*B33Y 10/00* (2015.01)
(Continued)

(52) U.S. Cl.
CPC .......... *B29C 64/393* (2017.08); *B29C 64/255* (2017.08); *B29C 64/357* (2017.08);
(Continued)

(58) Field of Classification Search
None
See application file for complete search history.

(56) References Cited

U.S. PATENT DOCUMENTS 6,007,318 A    12/1999  Russell et al.
2005/0174246 A1  8/2005  Piece et al.
(Continued)

FOREIGN PATENT DOCUMENTS

CN    101842222    9/2010
CN    102015531    4/2011
(Continued)

*Primary Examiner* — Yung-Sheng M Tsui
(74) *Attorney, Agent, or Firm* — Trop Pruner & Hu PC

(57) ABSTRACT

A system for manufacturing three dimensional objects can include logic to detect, for at least one vessel, a moisture content level corresponding to a build material residing in the at least one vessel. The logic can also adjust a humidity level and a temperature of a gas and a conditioning agent applied to the at least one vessel, wherein the humidity level and the temperature are based on the moisture content level and a temperature of the build material residing in the at least one vessel. Additionally, the logic can initialize manufacturing a three dimensional object with the build material from the at least one vessel in response to detecting the moisture content level of the build material residing in the at least one vessel is within a predetermined range.

19 Claims, 23 Drawing Sheets

(51) Int. Cl.
  *B33Y 30/00* (2015.01)
  *B33Y 50/02* (2015.01)
  *B29C 64/364* (2017.01)
  *B29C 64/357* (2017.01)
  *B29C 64/255* (2017.01)

(52) U.S. Cl.
  CPC ............ *B29C 64/364* (2017.08); *B33Y 10/00* (2014.12); *B33Y 30/00* (2014.12); *B33Y 50/02* (2014.12)

(56) References Cited

U.S. PATENT DOCUMENTS

| | | |
|---|---|---|
| 2006/0251535 A1 | 11/2006 | Pfeifer et al. |
| 2006/0251826 A1 | 11/2006 | Pfeifer et al. |
| 2013/0089642 A1 | 4/2013 | Lipson et al. |
| 2014/0198168 A1 | 7/2014 | Pervan et al. |
| 2014/0212677 A1 | 7/2014 | Gnuchtel et al. |
| 2015/0367446 A1 | 12/2015 | Buller et al. |
| 2016/0193696 A1* | 7/2016 | McFarland .......... B23K 26/342 219/76.12 |
| 2017/0106595 A1 | 4/2017 | Gunther et al. |
| 2017/0192377 A1 | 7/2017 | Batchelder et al. |
| 2017/0297263 A1 | 10/2017 | Ederer et al. |
| 2019/0176404 A1* | 6/2019 | Schoeneborn .......... B22F 10/70 |

FOREIGN PATENT DOCUMENTS

| | | |
|---|---|---|
| CN | 206273591 | 6/2017 |
| DE | 20122639 U1 | 11/2006 |
| EP | 3281729 A1 | 2/2018 |
| WO | WO-2014039378 A1 | 3/2014 |

* cited by examiner

500A

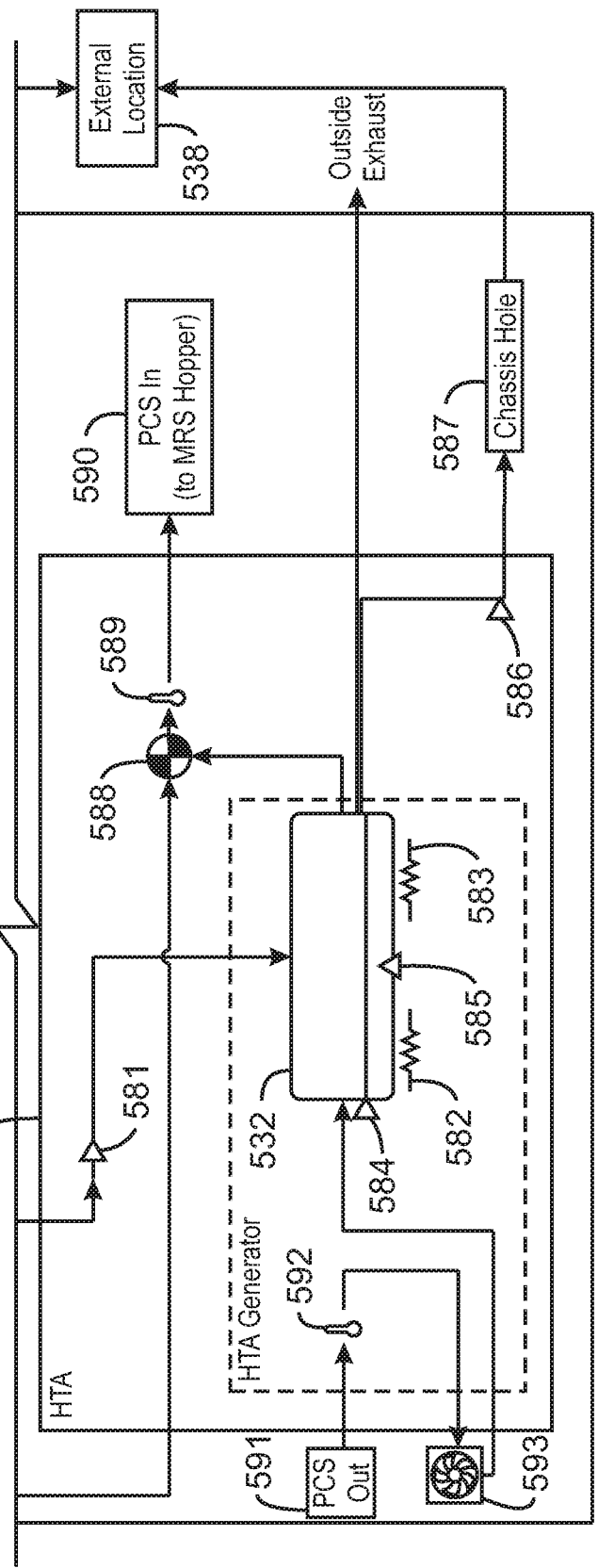

600

800

1300

1400

1700

THREE-DIMENSIONAL (3D) OBJECT PRINTING BASED ON A BUILD MATERIAL, MOISTURE CONTENT LEVEL

BACKGROUND

Three-dimensional (3D) printing may produce a 3D object by adding successive layers of build material, such as powder, to a build platform, then selectively solidifying portions of each layer under computer control to produce the 3D object. The build material may be powder, or powder-like material, including metal, plastic, ceramic, composite material, and other powders. In some examples the powder may be formed from, or may include, short fibers that may, for example, have been cut into short lengths from long strands or threads of material. The objects formed can be various shapes and geometries, and may be produced using a model, such as a 3D model or other electronic data source. The fabrication may involve laser melting, laser sintering, heat sintering, electron beam melting, thermal fusion, and so on. The model and automated control may facilitate the layered manufacturing and additive fabrication. The 3D printed objects may be prototypes, intermediate parts and assemblies, as well as end-use products. Product applications may include aerospace parts, machine parts, medical devices, automobile parts, fashion products, and other applications.

DESCRIPTION OF THE DRAWINGS

Certain examples are described in the following detailed description and in reference to the following drawings.

FIGS. 5A, 5B, and 5C depict a block diagram of a humidifier control for a 3D printer, in accordance with examples.

DETAILED DESCRIPTION

Introduction

Figure 1:
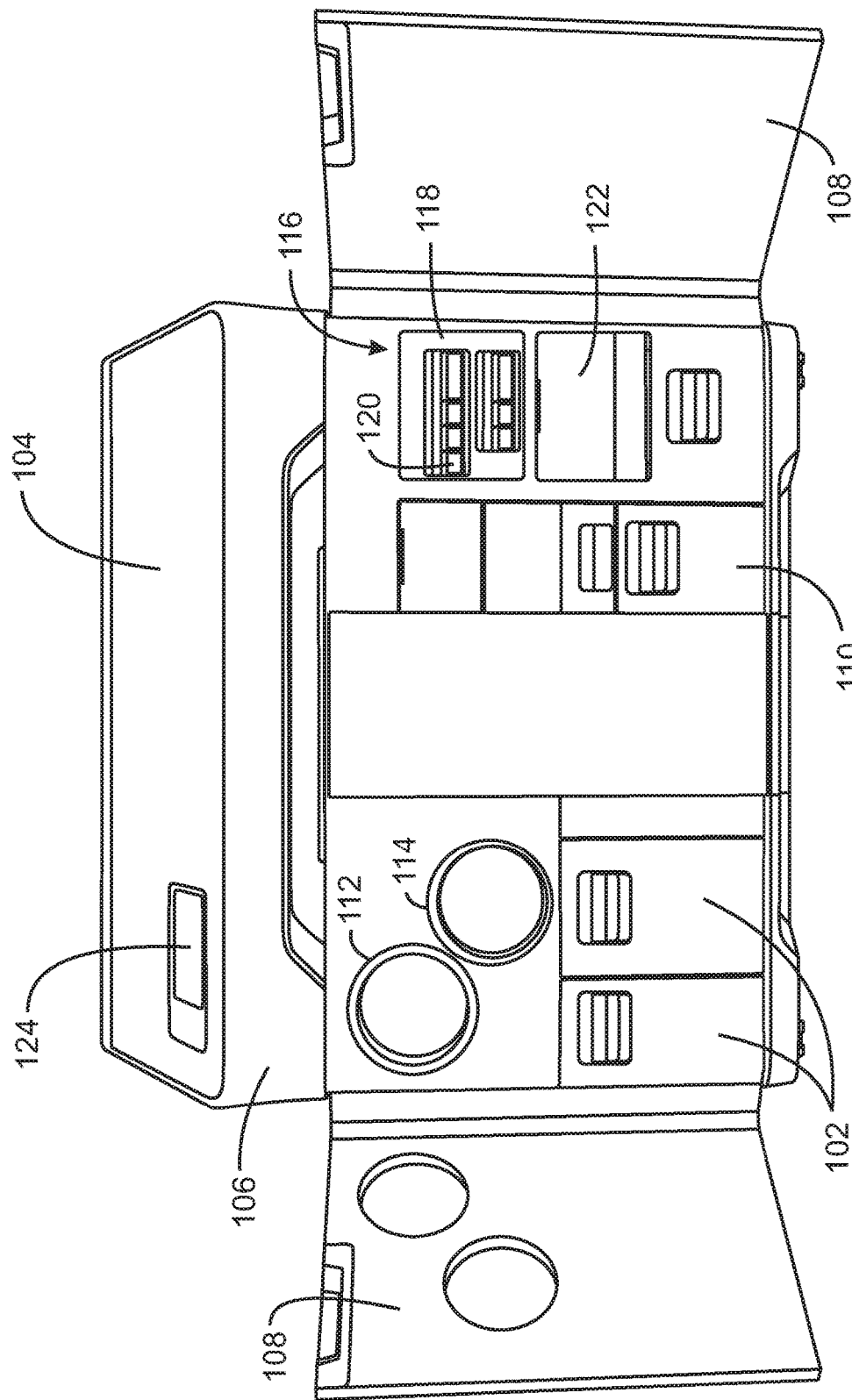
FIG. 1 is a drawing of a 3D printer, in accordance with examples.

Three dimensional printers may form 3D objects from different kinds of powder or powder-like build material. The cost of a 3D printer producing 3D objects may be related to the cost of the build material. Thus, there may be a desire for 3D printers to utilize recycled material as build material. Recycled build material may include, for example, build material that was used during a 3D printing process but which was not solidified during the 3D printing process. Such non-solidified build material may be recovered once a 3D printing process has completed and may be designated 'recycled build material' and reused in other 3D printing processes. For some applications, there may be benefit in utilizing new material because of reasons such as product purity, strength, and finish in certain instances. For some applications, a mix of new and recycled build material may be used, for example as a compromise between low cost and acceptable 3D object properties. For example, in some examples using about 20% new and about 80% recycled build material may be acceptable from both an economic and a quality perspective. Other proportions of new and recycled build material may be used depending on build material properties and acceptable object quality characteristics.

The build material may be a dry, or substantially dry, powder. In a three-dimensional printing example, the build material may have an average volume-based cross-sectional particle diameter size of between about 5 and about 400 microns, between about 10 and about 200 microns, between about 15 and about 120 microns or between about 20 and about 70 microns. Other examples of suitable, average volume-based particle diameter ranges include about 5 to about 70 microns, or about 5 to about 35 microns. As used herein, a volume-based particle size is the size of a sphere that has the same volume as the powder particle. The average particle size is intended to indicate that most of the volume-based particle sizes in the container are of the mentioned size or size range. However, the build material may include particles of diameters outside of the mentioned range. For example, the particle sizes may be chosen to facilitate distributing build material layers having thicknesses of between about 10 and about 500 microns, or between about 10 and about 200 microns, or between about 15 and about 150 microns. One example of a manufacturing system may be pre-set to distribute powdered material layers of about 80 microns using build material containers that include build material having average volume-based particle diameters of between about 40 and about 60 microns. An additive manufacturing apparatus may also be configured or controlled to form powder layers having different layer thicknesses.

As described herein, the build material can be, for example, a semi-crystalline thermoplastic material, a metal material, a plastic material, a composite material, a ceramic material, a glass material, a resin material, or a polymer material, among other types of build material. Further, the build material may include multi-layer structures wherein each particle comprises multiple layers. In some examples, a center of a build material particle may be a glass bead, having an outer layer comprising a plastic binder to agglomerate with other particles for forming the structure. Other materials, such as fibers, may be included to provide different properties, for example, strength.

Description of Examples Described Herein

The techniques described herein can enable a 3D printer to detect, for a plurality of vessels, a moisture content level corresponding to a build material residing in each of the plurality of vessels. The 3D printer can also adjust a humidity level and a temperature of a gas and a conditioning agent applied to each vessel, wherein the humidity level and the temperature are based on the moisture content level and a temperature of the build material residing in each vessel. The conditioning agent, as referred to herein, can include water vapor or any other suitable liquid or gas that can increase the humidity within a vessel. Furthermore, the 3D printer can initialize manufacturing a three dimensional object with the build material from at least one of the plurality of vessels if the moisture content level of the build material residing in the at least one vessel is within a predetermined range.

Accordingly, the techniques herein can enable a 3D printer to monitor and adjust the moisture content level of a build material, such as a powder, being used to manufacture a three dimensional object. By adjusting the moisture content level of a build material, the 3D printer can reduce any electrical charges or tribocharging within the build material and prevent or at least reduce a percentage of the build material from forming clumps during a build process. In some examples, the 3D printer can adjust the moisture content level of a build material to ensure a free flow of build material between storage vessels containing the build material and a build enclosure.

FIG. 1 is a drawing of a 3D printer 100, in accordance with examples. The 3D printer 100 may be used to generate a 3D object from a build material, for example, on a build platform. The build material may be a powder, and may include a plastic, a metal, a glass, or a coated material, such as a plastic-coated glass powder, among others.

The printer 100 may have covers or panels over compartments 102 for internal material vessels that hold build material. The material vessels may discharge build material through feeders into an internal conveying system for the 3D printing. The printer 100 may have a controller to adjust operation of the feeders to maintain a desired composition of build material including a specified ratio of materials in the build material. The internal material vessels may be removable via user-access to the compartments 102. The printer 100 may have a housing and components internal to the housing for handling of build material. The printer 100 has a top surface 104, a lid 106, and doors or access panels 108. The access panels 108 may be locked during operation of the 3D printer 100. The printer 100 may include a compartment 110 for an additional internal material vessel such as a recovered material vessel that recovers unfused or excess build material from a build enclosure of the printer 100.

As described in detail herein, build material may be added or removed from the 3D printer through build material containers that are horizontally inserted into supply stations. The supply stations may include a new supply station 112 for the addition of new build material, and a recycle supply station 114 for the addition of recycled build material. As described in examples, the recycle supply station 114 may also be used to offload recovered build material, for example, from the recovered material vessel. In one example, a single supply station may be provided which may be used for both adding new build material and for removing recycled build material from the printer.

In some examples, the 3D printer 100 may use a print liquid for use in a selective fusing process, or other purposes, such as decoration. For examples of a 3D printer 100 that employ a print liquid, a print-liquid system 116 may be included to receive and supply print liquid for the 3D printing. The print-liquid system 116 includes a cartridge receiver assembly 118 to receive and secure removable print-liquid cartridges 120. The print liquid system 116 may include a reservoir assembly 122 having multiple vessels or reservoirs for holding print liquid collected from the print liquid cartridges 120 inserted into the cartridge receiver assembly 118. The print liquid may be provided from the vessels or reservoirs to the 3D printing process, for example, to a print assembly or printbar above a build enclosure and build platform.

The 3D printer 100 may also include a user control panel or interface 124 associated with a computing system or controller of the printer 100. The control interface 124 and computing system or controller may provide for control functions of the printer 100. The fabrication of the 3D object in the 3D printer 100 may be under computer control. A data model of the object to be fabricated and automated control may direct the layered manufacturing and additive fabrication. The data model may be, for example, a computer aided design (CAD) model, a similar model, or other electronic source. As described with respect to FIG. 18 the computer system, or controller, may have a hardware processor and memory. The hardware processor may be a microprocessor, CPU, ASIC, printer control card, or other circuitry. The memory may include volatile memory and non-volatile memory. The computer system or controller may include firmware or code, e.g., instructions, logic, etc., stored in the memory and executed by the processor to direct operation of the printer 100 and to facilitate various techniques discussed herein.

Figure 2:
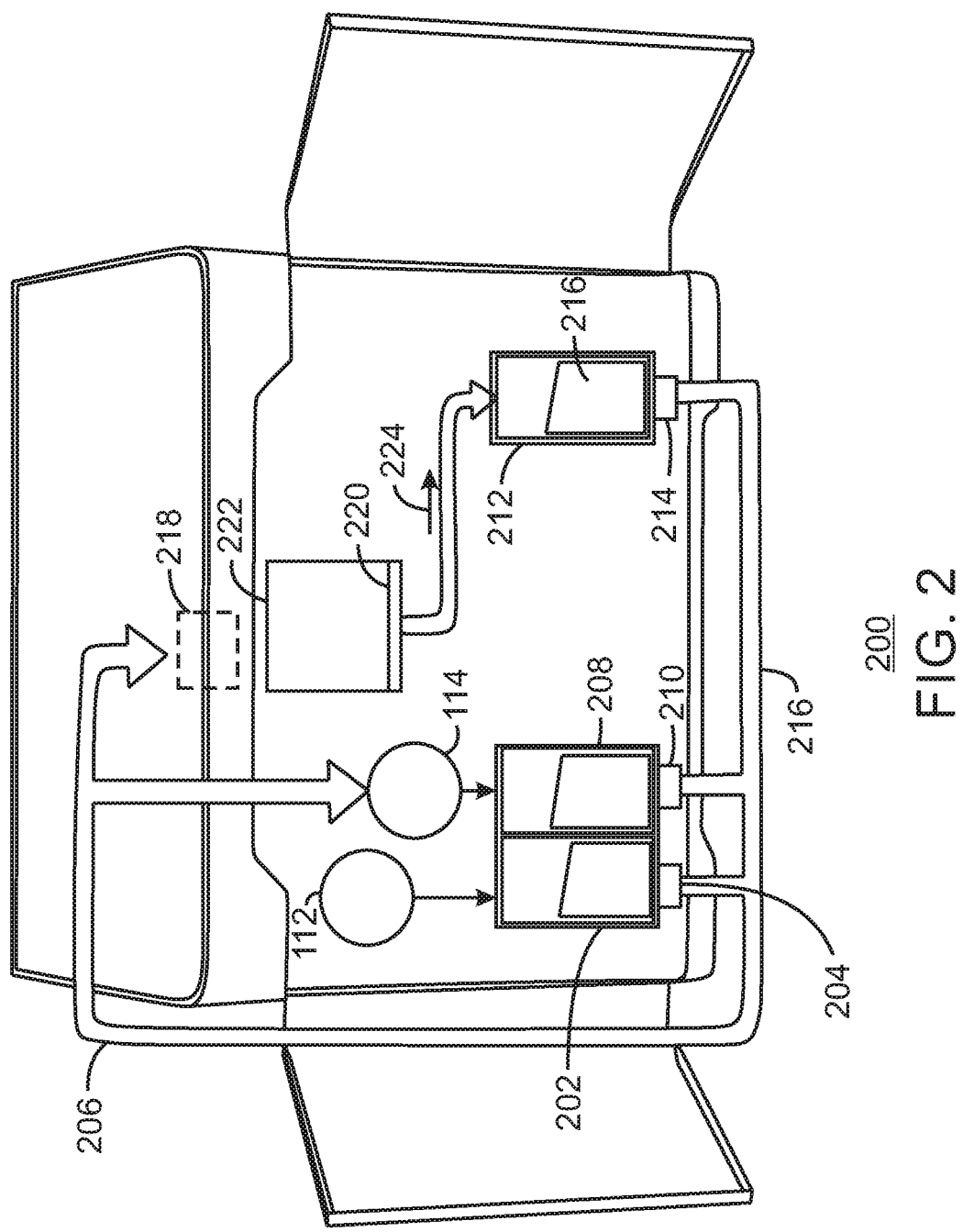
FIG. 2 is a schematic diagram of a 3D printer having a new material vessel that discharges new build material through a new feeder into a conveying system, in accordance with examples.

FIG. 2 is a schematic diagram of a 3D printer 200 having an internal new material vessel 202 that discharges new build material through a new feeder 204 into a conveying system 206, in accordance with examples. Like numbered items are as described with respect to FIG. 1. The printer 200 may include a recycle material vessel 208 to discharge recycle build material through a recycle feeder 210 to the conveying system 206. The printer 200 may have a controller to adjust operation of the feeders 204, 210 to maintain a composition and discharge rate of the build material for the 3D printing. Further, the printer 200 may include a recovered material vessel 212 to discharge recovered material 216 through a recovery feeder 214 into the conveying system 206. The conveying system 206 may transport the build material to a dispense vessel 218 which may supply build material for 3D printing. In the illustrated example, the dispense vessel 218 is disposed in an upper portion of the 3D printer 200. Moreover, although the conveying system 206 for the build material is depicted outside of the 3D printer 200 for clarity in this schematic view, the conveying system 206 is internal to the housing of the printer 200.

The 3D printer 200 may form a 3D object from the build material on a build platform 220 associated with a build enclosure 222. The 3D printing may include selective layer sintering (SLS), selective heat sintering (SHS), electron beam melting (EBM), thermal fusion, and fusing agent, chemical binder systems, such as BinderJet, metal type 3D printers, or other 3D printing and additive manufacturing (AM) technologies to generate the 3D object from the build material. In some examples, a suitable fusing agent may be an ink-type formulation comprising carbon black, such as, for example, the fusing agent formulation commercially known as V1Q60Q "HP fusing agent" available from HP Inc. In one example, such a fusing agent may additionally comprise an infra-red light absorber. In one example, such an ink may additionally comprise a near infra-red light absorber. In one example, such a fusing agent may additionally comprise a visible light absorber. In one example, such an ink may additionally comprise a UV light absorber. Examples of inks comprising visible light enhancers are dye based colored ink and pigment based colored ink, such as inks commercially known as CE039A and CE042A available from HP Inc. According to one example, a suitable detailing agent may be a formulation commercially known as V1Q61A "HP detailing agent" available from HP Inc. According to one example, a suitable build material may be PA12 build material commercially known as V1R10A "HP PA12" available from HP Inc. Recovered build material 224, for example, non-solidified or excess build material, may be recovered from the build enclosure 222. The recovered build material 224 may be treated and returned to the recovered material vessel 212.

Further, the printer 200 may include a new supply station 112 and a recycle supply station 114 to hold build material containers inserted by a user along a horizontal, or generally horizontal, axis. The supply stations 112 and 114 may provide new or recycled build material for the 3D printing to the new and recycle material vessels 202 and 208, respectively. Further, the conveying system 206 may return recovered material 216 to the recycle supply station 114. The recovered material 216 may be offloaded by being added to a build material container inserted in the recycle supply station 114, or may be diverted through the recycle supply station 114 to the recycle material vessel 208.

Lastly, as noted, the build material including the first material and the second material may be powder. A powder may be a granular material with a narrow size distribution, such as beads, or other shapes of small solids that may flow and be conveyed in an air stream. As used herein, the term "powder" as build material can, for example, refer to a powdered, or powder-like, material which may be layered and sintered via an energy source or fused via a fusing agent, or a fusing agent and energy source in a 3D printing job. In some examples, the build material may be formed into a shape using a chemical binder, such as a solvent binder or a reaction promoter. The build material can be, for example, a semi-crystalline thermoplastic material, a metal material, a plastic material, a composite material, a ceramic material, a glass material, a resin material, or a polymer material, among other types of build material.

Figure 3:
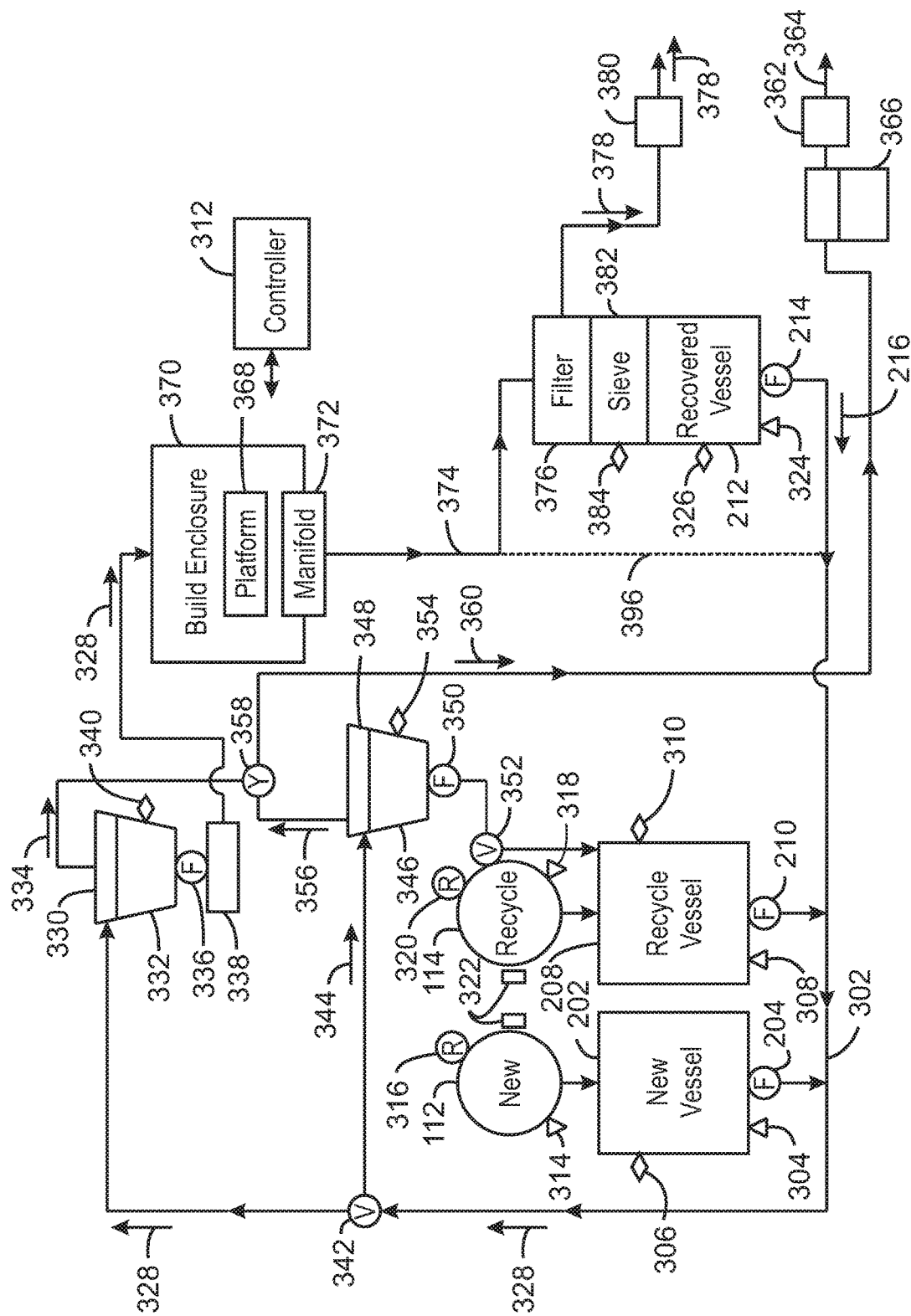
FIG. 3 is a block diagram of a 3D printer without a humidifying system, in accordance with examples.

FIG. 3 is a block diagram of a 3D printer 300 without a humidifying system, in accordance with examples. Like numbered items are as described with respect to FIGS. 1 and 2. As shown in this drawing, material flows are shown by labelled arrows placed along conveying lines or conduits, which may be separately labeled. In this example, the 3D printer 300 may have a new material vessel 202 that discharges new material through a feeder 204, such as a rotary feeder, auger, or screw feeder, into a first conveying system 302, which may be a pneumatic conveying system. The feeder 204 may drop the new material into a conduit of the conveying system 302. The feeder 204 may meter or regulate material discharge or otherwise facilitate dispensing of the desired amount of new material from the new material vessel 202 into the first conveying system 302. In addition, the 3D printer 300 may include a recycle material vessel 208 that discharges recycle material through a feeder 210 into the first conveying system 302.

The new material vessel 202 may have a weight sensor 304 and a fill level sensor 306. Likewise, the recycle material vessel 208 may have a weight sensor 308 and a fill level sensor 310. A controller 312 of the printer 300, as described with respect to FIG. 8, may adjust operation of the feeders 204 and 210 in response to indications of material discharge amount or rate provided by the weight sensors 304 and 308. The controller may adjust operation of the feeders 204 and 210 to maintain a desired ratio of new material to recycle material. In examples described herein, the controller 312 may control the dispensing of build material from a build material container, or the offloading of build material to a build material container.

The 3D printer 300 may include a new supply station 112 to hold a build material container for adding new build material in a cylindrical cage, along a horizontal axis. The new material vessel 302 may receive new build material from the build material container held by the new supply station 112. As described herein, the new supply station 112 may include several sensors and actuators to determine if a build material container is present, and control the dispensing of build material from the build material container. The sensors may include a weighing device 314 that may be used to determine the weight of the new supply station 112 and the build material container. The actuators may include a motor 316 to rotate the cylindrical cage in a first angular direction to dispense build material to the new material vessel 202.

The number of rotations of the cylindrical cage may be used to control the dispensing of an expected amount of build material from a build material container. Accordingly, the motor 316 may be a stepper motor, a servo motor, or other type of motor that may be used to control the number of revolutions and the speed of the rotation. In some examples, a motor having a controlled speed, such as a motor control using pulse width modulation or pulse frequency modulation, may be used with a sensor that counts the number of revolutions. For example, a base position sensor as described herein may be used to count the revolutions.

The 3D printer 300 may include a recycle supply station 114 to hold a build material container for recycled material. As described for the new supply station 112, the recycle supply station 114 may include several sensors and actuators to determine if a build material container is present, and control the dispensing of recycled build material from the build material container, for example, into a recycled material vessel. The sensors may include a weighing device 318 that may be used to determine the weight of the recycle supply station 114 and a build material container. The actuators may include a motor 320 to rotate the cylindrical cage in a first angular direction to dispense build material to the recycle material vessel 208. The recycle supply station 114 may also rotate the cylindrical cage in a second angular direction, opposite the first angular direction, to add recovered or recycled material to the build material container.

The new supply station 112 and the recycle supply station 114 may also include several other sensors and actuators 322 to provide functionality, as described in greater detail herein. The other sensors and actuators 322 may include a latching sensor to determine if a build material container is secured in a supply station, and a position sensor to determine if a build material container is in a base position, among others. As used herein, a base position is an initial position of the build material container after insertion into a supply station 112 or 114. In the base position, sensors and actuators 322 on a support structure may interact with the cylindrical cage. Further, the sensors and actuators 322 may include actuators to actuate a valve on the build material container, for example, opening or closing the valve, or advance the read head to an information chip on a build material container, among others.

As described herein, the printer 300 may include a recovered material vessel 212 which discharges recovered material 216 through a recovery feeder 214 into the first conveying system 302. The recovered material vessel 212 may have a weight sensor 324 and a fill level sensor 326. Accordingly, the build material 328 may include recovered material 216 from the recovered material vessel 212 in addition to the recycle material from the recycle material vessel 208 and new material from the new material vessel 202.

Conveying air may flow through the first conveying system 302. An air intake such as a filtered manifold or an open conduit as may receive, pull in, and/or filter air (e.g., ambient air) as conveying air for the first conveying system 302. The air may also be used for the second conveying system discussed below. The first conveying system 302 may transport the build material 328, e.g., a mix of new material, and recycle material from the vessels 202 and 208, respectively. In some instances, the build material 328 may also include recovered material 216. In the illustrated example, the first conveying system 302 may convey the build material 328 to a separator 330 associated with a dispense vessel 332. The dispense vessel 332 may be a feed vessel. The separator 330 may include a cyclone, a screen, a filter, and the like. The separator 330 may separate conveying air 334 from the build material 328.

After the conveying air 334 has been separated, the build material 328 may flow into the dispense vessel 332. A feeder 336 may receive build material from the dispense vessel 332 and discharge the build material to a build material handling system 338 for the 3D printing. The dispense vessel 332 may have a fill level sensor 340. The fill level sensor 340 may measure and indicate the level or height of build material in the dispense vessel 332.

The first conveying system 302 may divert build material 328 via a diverter valve 342. The diverted material 344 may be sent to an alternate vessel 346 through a separator 348 such as cyclone, filter, etc. The alternate vessel 346 may discharge the diverted material 344 through a feeder 350 and diverter valve 352 to either a build material container in the supply station 114, or to the recycle material vessel 208. As described in examples herein, the diverter valve 352 may be part of a valve mechanism used to dispense recycled build material from a build material container.

This diversion of build material 328 by diverter valve 342 as recycle material 344 may occur, for instance, when the build material 328 is primarily recycle material or recovered material 216. This may be performed to offload material, for example, by diverting the material through diverter valve 352 to a build material container. In other examples, the recycle material 344 may be sent by the diverter valve 352 to the recycle material vessel 208. As with other material vessels, the alternate vessel 346 may have a fill level sensor 354.

The separator 348 associated with the alternate vessel 346 may remove conveying air 356 from the build material 328. After the conveying air 356 is removed from the build material 328, the build material 328 may discharge from the separator 348 into the alternate vessel 346. In the illustrated example, the conveying air 356 from the separator 348 may flow to a Y-fitting 358, where the conveying air 356 is combined with the conveying air 334 from the separator 330 associated with the dispense vessel 332. The Y-fitting 358 may be a conduit fitting having two inlets and one outlet. The combined conveying air 360 may be pulled from the Y-fitting 358 by a motive component 362 of the first conveying system 302 and discharged 364 to the environment or to additional equipment for further processing. In some examples, the combined conveying air 360 may flow through a filter 366 as it is being pulled out by the motive component 362. The filter 366 may remove particulates from the conveying air 360 before it is discharged 364.

The motive component 362 applies motive force for the conveying air in the first conveying system 302 to transport build material. The motive component 362 may be an air blower, eductor, ejector, vacuum pump, compressor, or other motive component. Because the first conveying system 302 is generally a pneumatic conveying system, the motive component may typically include a blower such as a centrifugal blower, fan, axial blower, and the like.

As for the 3D printing, as mentioned, the dispense vessel 332 may discharge the build material 328 through a feeder 336 to the build material handling system 338. The feeder 336 and the build material handling system 338 may provide a desired amount of build material 328 across a build platform 368, for example, in layers. The build material handling system 338 may include a feed apparatus, dosing device, build-material applicator, or powder spreader, and the like, to apply the build material to the build platform 368 in the build enclosure 370. The printer 300 may form a 3D object from build material 328 on the build platform 368.

After the 3D object is complete or substantially complete on the build platform 368, a vacuum manifold 372 may remove excess build material from the build enclosure 370 into a second conveying system 374 as recovered material. In some examples, a second conveying system 374 is not used. For example, the excess build material may be offloaded with the 3D object or removed by a stand-alone vacuum.

If the second conveying system 374 is used, it may convey the recovered material through a cyclone or filter 376 to separate the recovered material from the conveying air 378. The conveying air 378 is discharged through a motive component 380 of the second conveying system 374. A filter may be included to remove particulates from the conveying air 378. The motive component 380 may be a blower, fan, eductor, ejector, vacuum pump, or other type of motive component. In this example, the recovered material may discharge from the cyclone or filter 376 and enter a sieve 382 where larger particles, such as solidified build material not incorporated into the 3D object, may be removed. The sieve 382 may have a fill level sensor 384 which monitors the level or height of solid material in the sieve 382.

After separation of the larger particles, the recovered build material may enter the recovered material vessel 212.

In some examples, the recovered material may bypass the cyclone or filter 376, sieve 382, and recovered material vessel 212 and flow into a conduit of the first conveying system 302, as indicated by the dashed line 396. The vessels, conveying systems, and associated equipment of the 3D printer 300 may include instrumentation such as pressure sensors and temperature sensors, and the like.

The 3D printer 300 may fabricate objects as prototypes or products for aerospace (e.g., aircraft), machine parts, medical devices (e.g., implants), automobile parts, fashion products, structural and conductive metals, ceramics, and so forth. In one example, the 3D objects formed by the 3D printer 300 are mechanical parts which may be metal or plastic, and which may be equivalent or similar to mechanical parts produced by other fabrication techniques, for example, injection molding or blow molding, among others.

Figure 4:
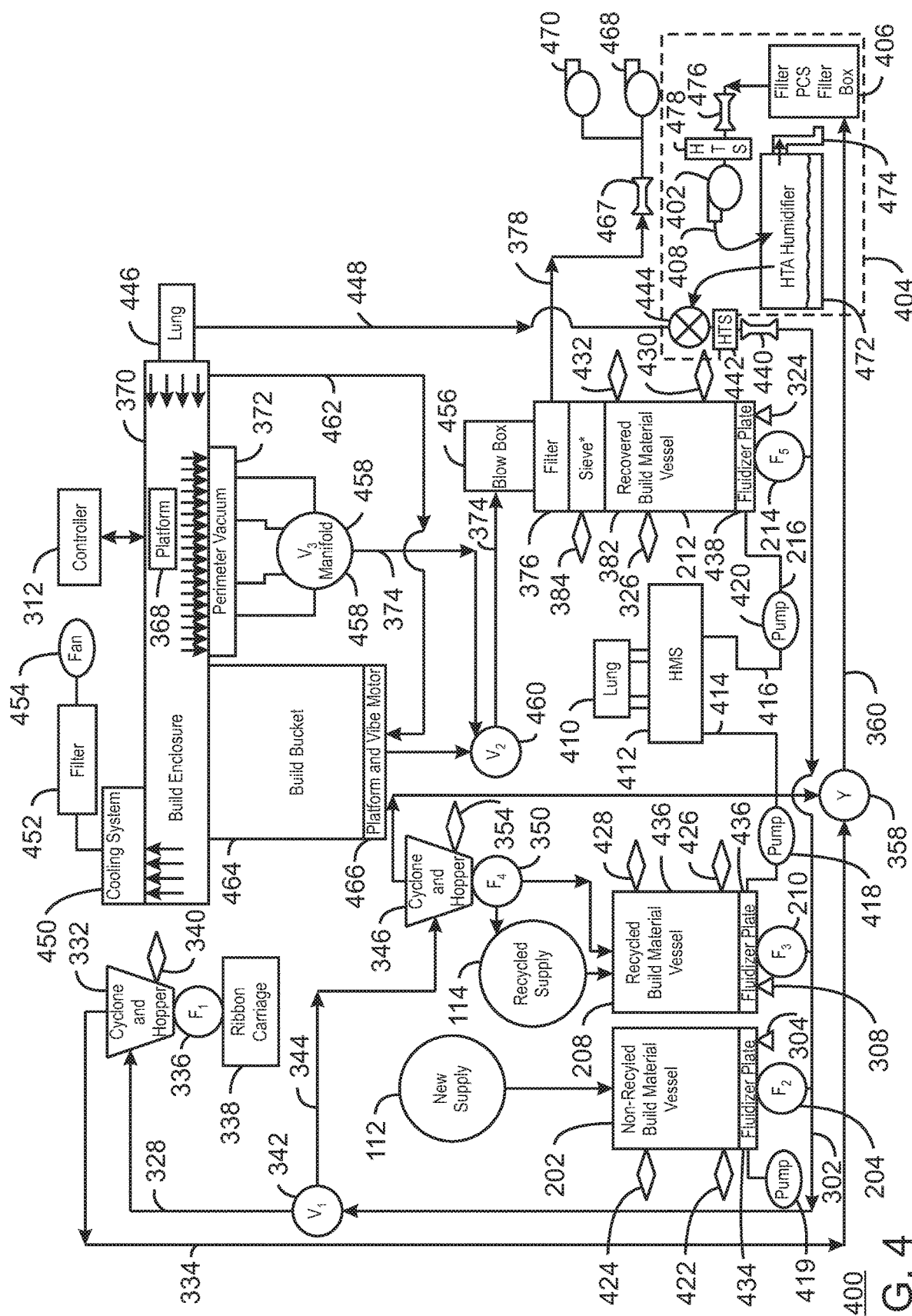
FIG. 4 is a block diagram of a 3D printer with a humidifying system, in accordance with examples.

FIG. 4 is a block diagram of a 3D printer with a humidifying system. The 3D printer 400 can provide humidity to build material stored in build material vessels in accordance with examples. Like numbered items are as described with respect to FIGS. 1, 2, and 3. As shown in this drawing, material flows are shown by labelled arrows placed along conveying lines or conduits, which may be separately labeled. In this example, the 3D printer 400 may have a new material vessel 202 that discharges new material through a feeder 204, such as a rotary feeder, auger, or screw feeder, into a first conveying system 302, which may be a pneumatic conveying system. The feeder 204 may drop the new material into a conduit of the conveying system 302. The feeder 204 may meter or regulate material discharge or otherwise facilitate dispensing of the desired amount of new material from the new material vessel 202 into the first conveying system 302. In addition, the 3D printer 400 may include a recycle material vessel 208 that discharges recycle material through a feeder 210 into the first conveying system 302.

The new material vessel 202 may have a weight sensor 304. Likewise, the recycle material vessel 208 may have a weight sensor 308. A controller 312 of the printer 400, as described with respect to FIG. 8, may adjust operation of the feeders 204 and 210 in response to indications of material discharge amount or rate provided by the weight sensors 304 and 308. The controller 312 may adjust operation of the feeders 204 and 210 to maintain a desired ratio of new material to recycle material. In examples described herein, the controller 312 may control the dispensing of build material from a build material container, or the offloading of build material to a build material container.

The 3D printer 400 may include a new supply station 112 to hold a build material container for adding new build material in a cylindrical cage, along a horizontal axis. The new material vessel 202 may receive new build material from the build material container held by the new supply station 112. As described herein, the new supply station 112 may include several sensors and actuators to determine if a build material container is present, and control the dispensing of build material from the build material container.

The 3D printer 400 may include a recycle supply station 114 to hold a build material container for recycled material. As described for the new supply station 112, the recycle supply station 114 may include several sensors and actuators to determine if a build material container is present, and control the dispensing of recycled build material from the build material container, for example, into a recycled material vessel. The recycle supply station 114 may also rotate the cylindrical cage in a second angular direction, opposite the first angular direction, to add recovered or recycled material to the build material container.

As described herein, the printer 400 may include a recovered material vessel 212 which discharges recovered material 216 through a recovery feeder 214 into the first conveying system 302. The recovered material vessel 212 may have a weight sensor 324 and a fill level sensor 326. Accordingly, the build material may include recovered material 216 from the recovered material vessel 212 in addition to the recycle material from the recycle material vessel 208 and new material from the new material vessel 202.

Conveying air may flow through the first conveying system 302. An air intake such as a filtered manifold or an open conduit as may receive, pull in, and/or filter air (e.g., ambient air) as conveying air for the first conveying system 302. The air may also be used for the second conveying system discussed below. The first conveying system 302 may transport the build material, e.g., a mix of new material, and recycle material from the vessels 202 and 208, respectively. In some instances, the build material may also include recovered material 216. In the illustrated example, the first conveying system 302 may convey the build material 328 to a dispense vessel 332. The dispense vessel 332 may be a feed vessel.

A feeder 336 may receive build material from the dispense vessel 332 and discharge the build material to a ribbon cartridge or build material handling system 338 for the 3D printing. The dispense vessel 332 may have a fill level sensor 340. The fill level sensor 340 may measure and indicate the level or height of build material in the dispense vessel 332.

The first conveying system 302 may divert build material 328 via a diverter valve 342. The diverted material 344 may be sent to an alternate vessel 346 through a separator such as cyclone, filter, etc. The alternate vessel 346 may discharge the diverted material 344 through a feeder 350 to either a build material container in the supply station 114, or to the recycle material vessel 208.

This diversion of build material 328 as recycle material 344 may occur, for instance, when the build material 328 is primarily recycle material or recovered material 216. This may be performed to offload material, for example, by diverting the material to a build material container. In other examples, the recycle material 344 may be sent to the recycle material vessel 208. As with other material vessels, the alternate vessel 346 may have a fill level sensor 354.

In some examples, a separator (not depicted) associated with the alternate vessel 346 may remove conveying air 356 from the build material 328. After the conveying air 356 is removed from the build material 328, the build material 328 may discharge from the separator into the alternate vessel 346. In the illustrated example, the conveying air 356 from the separator may flow to a Y-fitting 358, where the conveying air 356 is combined with the conveying air 334 from the dispense vessel 332. The Y-fitting 358 may be a conduit fitting having two inlets and one outlet. The combined conveying air 360 may be pulled from the Y-fitting 358 by a motive component 402 of the separate humidified transport air (HTA) humidifier 404 through a filter 406 and discharged conveying air 408 can be provided into the HTA humidifier 404. The filter 406 may remove particulates from the conveying air 360 before discharged conveying air 408 is provided into the HTA humidifier 404. The HTA humidifier 404 can provide humidified air to the conduit lines that transport build material from the new vessel 202, recycle vessel 208, and recovered vessel 212 to the build enclosure 370.

The motive component 402 applies motive force for the conveying air in the first conveying system 302 to transport build material. The motive component 402 may be an air blower, eductor, ejector, vacuum pump, compressor, or other motive component. Because the first conveying system 302 is generally a pneumatic conveying system, the motive component may typically include a blower such as a centrifugal blower, fan, axial blower, and the like.

As for the 3D printing, as mentioned, the dispense vessel 332 may discharge the build material 328 through a feeder 336 to the build material handling system 338. The feeder 336 and the build material handling system 338 may provide a desired amount of build material 328 across a build platform 368, for example, in layers. The build material handling system 338 may include a feed apparatus, dosing device, build-material applicator, or powder spreader, and the like, to apply the build material to the build platform 368 in the build enclosure 370. The printer 400 may form a 3D object from build material 328 on the build platform 368.

After the 3D object is complete or substantially complete on the build platform 368, a vacuum manifold 372 may remove excess build material from the build enclosure 370 into a second conveying system 374 as recovered material. In some examples, a second conveying system 374 is not used. For example, the excess build material may be off-loaded with the 3D object or removed by a stand-alone vacuum.

In some examples, the 3D printer 400 can also include a lung 410 that can provide air to a humidifier management system (HMS) 412. The HMS 412 can transmit the conditioning agent through conduits 414 and 416 and pumps 418, 419, and 420 to the new vessel 304, recycle vessel 310, and recovered vessel 212. The conditioning agent, as referred to herein, can include water vapor added to ambient air to result in humidified air, among others.

In some examples, the new vessel 202, recycle vessel 208, and recovered vessel 212 can include any suitable number of pressure sensors 422, 424, 426, 428, 430, and 432. In some examples, the new vessel 202, recycle vessel 208, and recovered vessel 212 can include at least two pressure sensors, in which one pressure sensor is located at the bottom of the new vessel 202, recycle vessel 208, and recovered vessel 212 and a separate pressure sensor is located proximate a top of the new vessel 202, recycle vessel 208, and recovered vessel 212. In some examples, logic or a controller 312 attached to the pressure sensors 422, 424, 426, 428, 430, and 432 can detect pressure differentials. For example, the logic or controller 312 can determine a different pressure exists between a bottom of new vessel 202, recycle vessel 208, or recovered vessel 212 and a top of new vessel 202, recycle vessel 208, or recovered vessel 212.

In some examples, the logic or controller 312 can apply a gas with at least one flow rate to the new vessel 202, recycle vessel 208, or recovered vessel 212 of the three dimensional printer 400, wherein the at least one flow rate is less than a fluidization rate. The gas can include atmospheric air comprising nitrogen, oxygen, argon, and carbon dioxide, among others. In some examples, the gas can include any suitable number or mixtures of gases. In some examples, the logic or controller 312 can also detect a permeability of a build material residing within the new vessel 202, recycle vessel 208, or recovered vessel 212, wherein the permeability is calculated based on a plurality of pressure values detected by the pressure sensors pressure sensors 422, 424, 426, 428, 430, and 432 residing in the new vessel 202, recycle vessel 208, or recovered vessel 212. In some examples, the logic or controller 312 can also apply the gas with a predetermined humidity level at a second flow rate to modify the permeability of the build material residing in the new vessel 206, recycle vessel 208, or recovered vessel 212. The predetermined humidity level can be provided by the HMS 412 and applied to a gas provided by the lung 410. In some examples, the logic or controller 312 can initialize manufacturing a three dimensional object with the build material in response to detecting the permeability of the build material is below a predetermined threshold. In some examples, the conditioning fluid and air provided by the HMS 412 can be provided to the new vessel 202, recycle vessel 208, and recovered vessel 212 via fluidizer plates 434, 436, and 438.

In some examples, the HTA 404 can provide a gas and a conditioning agent, such as humidified air, to the conduit lines transporting build material. In some examples, the HTA 404 can transmit the gas and the conditioning agent to the conduit lines via an inlet venturi 440 and a humidity sensor (HTS) 442 and a diverter valve 444. The HTA 404 can provide humidified air to the conduit lines, in some examples, to ensure that build material is transported freely between the new vessel 202, recycle vessel 208, and recovered vessel 212 and the build enclosure 370.

In some examples, the build enclosure 370 can receive a gas from a lung 446 that also provides the gas 448 to the HTA 404. In some examples, the build enclosure 370 can also be coupled to a cooling system 450 that can extract exhaust air from the build enclosure 370 and transport the exhaust air to a filter 452 and a fan 454.

The build enclosure 370 can be coupled to a perimeter vacuum 372 that can couple to any suitable number of conduit lines that transmit air from the build enclosure 370 to a blow box 456 via valve manifold V3 458 and valve V2 460. In some examples, the valve manifold V3 458 can have any suitable number of selectable positions including an off position. In some examples, the build enclosure 370 can also be coupled to a conduit line 462 that transports air from within the build enclosure 370 to a build bucket 464 through a platform and vibration motor 466. The build bucket 464 can store excess build material from the build enclosure 370 that can be transported via valve V2 458 to the blow box 456.

If the second conveying system 374 is used, it may convey the recovered material through the blow box 456 to a cyclone or filter 376 to separate the recovered material from the conveying air 378. The blow box 456 can provide the excess build material to the filter 376, sieve 382, and recovered vessel 212. If the second conveying system 374 is used, it may convey the recovered material through a cyclone or filter 376 to separate the recovered material from the conveying air 378. The conveying air 378 is discharged through a venturi 467 and motive component 468 or 470 of the second conveying system 374. A filter may be included to remove particulates from the conveying air 378. The motive components 468 and 470 may blowers, fans, eductors, ejectors, vacuum pumps, or any other type of motive component. In this example, the recovered material may discharge from the cyclone or filter 376 and enter a sieve 382 where larger particles, such as solidified build material not incorporated into the 3D object, may be removed. The sieve 382 may have a fill level sensor 384 which monitors the level or height of solid material in the sieve 382.

After separation of the larger particles, the recovered build material may enter the recovered material vessel 212. In this example, the recovered material may discharge from the cyclone or filter 376 and enter sieve 382 where larger particles, such as solidified build material not incorporated into the 3D object, may be removed. The vessels, conveying systems, and associated equipment of the 3D printer 400 may include instrumentation such as pressure sensors and temperature sensors, and the like.

The 3D printer 400 may fabricate objects as prototypes or products for aerospace (e.g., aircraft), machine parts, medical devices (e.g., implants), automobile parts, fashion products, structural and conductive metals, ceramics, and so forth. In one example, the 3D objects formed by the 3D printer 400 are mechanical parts which may be metal or plastic, and which may be equivalent or similar to mechanical parts produced by other fabrication techniques, for example, injection molding or blow molding, among others.

The 3D printer 400 may include fewer or additional components. For example, the HTA humidifier 404 can also include a water tank 472 that provides water vapor to the diverter valve 444. The HTA humidifier 404 can also include a safety overflow feature 474 to transport water from the water tank 472 to outside of the 3D printer 400. The HTA humidifier 404 can also include an outlet venturi 476 and humidity sensor (HTS) 478 to facilitate conveying gas from the filter 406 to the motive component 402. In some examples, the HTA humidifier 404 can provide a second conditioning agent to at least one pneumatic air transport line for transporting the build material from at least one vessel to a second vessel or a build enclosure. The HTA humidifier 404 can also provide a second conditioning agent to a transport line operating under gravity such as a chute, vessel exit, and the like.

Figure 5A:
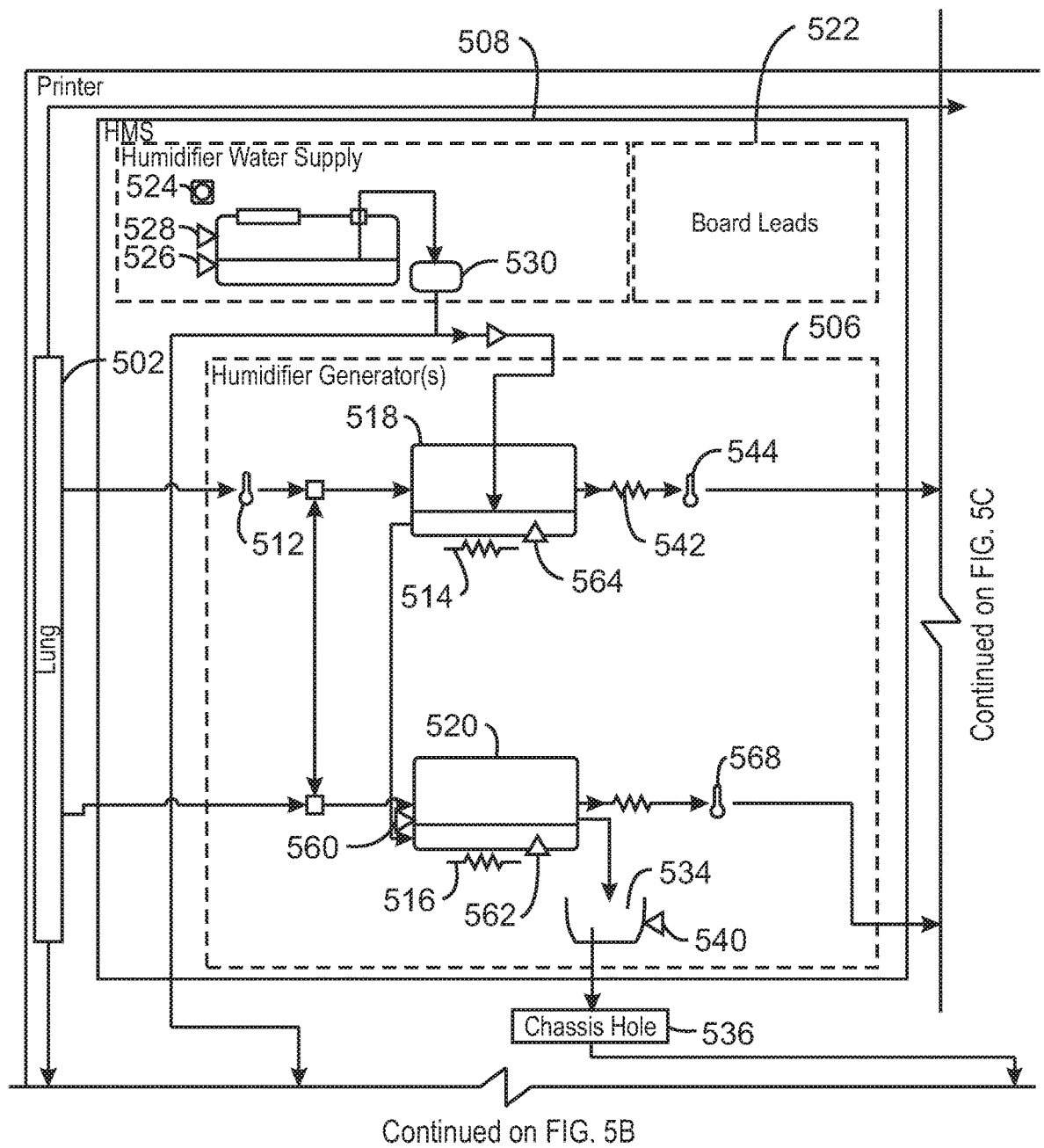
Figure 5C:
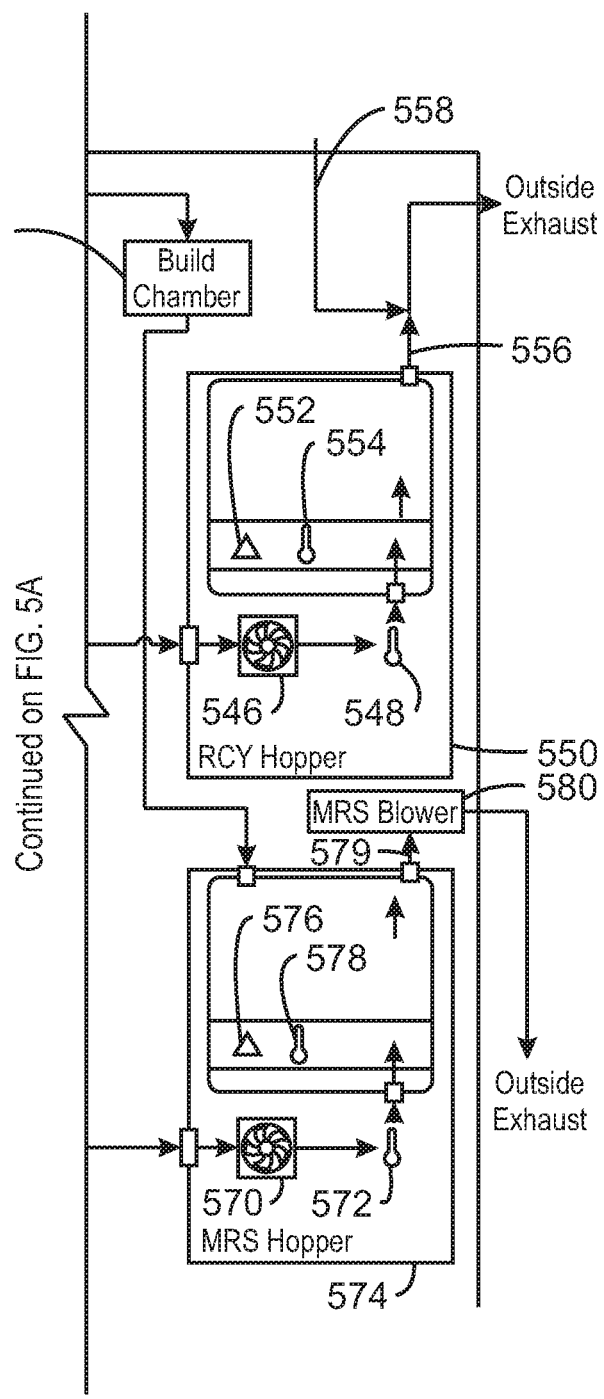

FIGS. 5A, 5B, and 5C depict a block diagram of a humidifier control for a 3D printer, in accordance with examples. In some examples, a lung 502 of FIG. 5A can provide any suitable gas or mixture of gases to a build enclosure 504 illustrated in FIG. 5C, a humidifier generator 506 residing within a humidifier management system (HMS) 508, and a humidity transport air (HTA) module 510 illustrated in FIG. 5B.

In some examples, the gas from the lung 502 can be monitored by a relative humidity and temperature sensor 512 in the humidifier generator 506. In some examples, the gas from the lung 502 is applied to the two water heaters 514 and 516 corresponding to water reservoirs 518 and 520 respectively. In some examples, water reservoir 518 receives water from the humidifier water supply 522 in the HMS 508. The HMS 508 can include a light emitting diode (LED) 524 that can flash any suitable number of times to indicate if the water heaters 514 and 516 are active, if the HMS 508 is configurable, or if the HMS 508 has a connection with the humidifier generator 506. In some examples, the humidifier water supply 522 can also include a water level sensor 526 to indicate a level of the water stored in the humidified water supply 522 and a PSNC sensor 528 to detect whether a tank is inserted. In some examples, the water provided from the humidified water supply 522 to the water reservoir 518 flows through any suitable type of pump 530. In some examples, the water from the humidified water supply 522 can also be transported to a water reservoir 532 residing in the HTA module 510 of FIG. 5B.

In some examples, the water reservoir 518 can be coupled to the water reservoir 520 to provide water. The water reservoir 520 can include an overflow valve 534 that transports water through a chassis hole 536 to an external location 538 of FIG. 5B outside of the three dimensional printer 500. The overflow valve 534 can include a switch 540 in some examples. In some examples, the water reservoir 518 can provide heated water vapor through a water heater 542 and a relative humidity and temperature sensor 544 in the humidifier generator 506 and a fan or blower 546 (illustrated in FIG. 5C) and a real humidity and temperature sensor 548 in a recycled build material vessel 550. In some examples, the recycled build material vessel 550 can store recycled build material from previous builds within the three dimensional printer 500. The recycled build material vessel 550 can include a thermistor 552 to detect a resistance dependent on temperature within the recycled build material and a relative humidity and temperature sensor 554 to detect the relative humidity and the temperature of the recycled build material. In some examples, exhaust 556 from the recycled build material vessel 550 can be mixed with internal cooling air 558 as the exhaust 556 exits a top of the recycled build material vessel 550.

In some examples, the water reservoir 520 of FIG. 5A can include a water tank sensor 560 to monitor a level of the water stored in the water reservoir 520. The water reservoir 520 can also include a thermistor 562 to detect a resistance of the water stored in the water reservoir 520 based on a resistance dependent on temperature. In some examples, the water reservoir 518 can also include a thermistor 564 to detect a resistance of the water stored in the water reservoir 518. In some examples, the water reservoir 520 can provide heated water vapor through a water heater 566 and a relative humidity and temperature sensor 568 in the humidifier generator 506 and a fan or blower 570 (illustrated in FIG. 5C) and a real humidity and temperature sensor 572 in a non-recycled build material vessel 574. In some examples, the non-recycled build material vessel 574 can store non-recycled build material that is new to the three dimensional printer 500 and not from previous builds. The non-recycled build material vessel 574 can include a thermistor 576 to detect a resistance dependent on temperature within the non-recycled build material and a relative humidity and temperature sensor 578 to detect the relative humidity and the temperature of the non-recycled build material. In some examples, exhaust 579 from the non-recycled build material vessel 574 can be transported from a top of the non-recycled build material vessel 574 through a blower 580. In some examples, the non-recycled build material vessel 574 can receive air from the build enclosure 504.

In some examples, the HTA module 510 can include the water reservoir 532 that can receive water from the humidified water supply 516 via a water valve 581. In some examples, the water reservoir 532 can include any number of water heaters 582, 583, water tank sensor 584, and a thermistor 585 that can detect the resistance dependent on temperature of the water stored in the water reservoir 532. In some examples, the water from the water reservoir 532 can overflow through an overflow sensor 586 and a chassis hole 587 to the external location 538 outside of the three dimensional printer 500.

In some examples, the water vapor from the water reservoir 532 of FIG. 5C can be provided to a two-way diverter valve 588 that also receives a gas from the lung 502. The two-way diverter valve 588 can transport the water vapor through a relative humidity and temperature sensor 589 and to an input location for the non-recycled build material vessel 590. The two-way diverter valve 588 can enable mixing non-humid air from the lung 502 with humid air from the HTA 510 humidifier to increase humidity control. In some examples, a gas output port 591 can transport gas through a relative humidity and temperature sensor 592 of the HTA 510. The gas can be provided to an external fan or blower 593, which blows the gas into the water reservoir 532.

Figure 6:
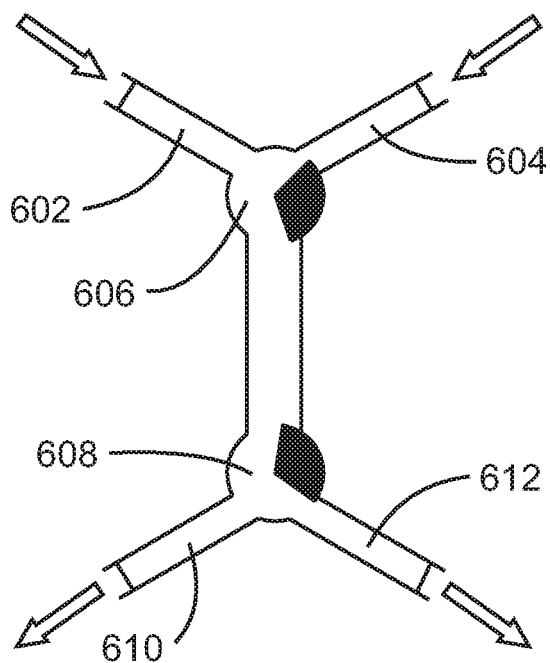
FIG. 6 is an example component for controlling a flow of a gas and a conditioning agent within a 3D printer, in accordance with examples.

FIG. 6 is an example component for controlling a flow of a gas and a conditioning agent within a three dimensional printer, in accordance with examples. The component 600 can receive controlled air, such as a gas with a conditioning agent, via conduit 602 and ambient air via conduit 604. The conditioning agent can include water vapor generated by any suitable source such as the humidity management system (HMS) or humidity transport air (HTA) controller discussed above in relation to FIGS. 4 and 5. The conditioning agent can modify the humidity level of the gas to a predetermined humidity level. The ambient air can be provided to conduit 604 from any suitable source outside a three dimensional printer comprising the component 600. The three-way valve 606 can be adjusted by a controller (not depicted) to allow any suitable combination of the gas with the particular humidity level and the ambient air to flow to a subsequent three-way valve 608. In some examples, the three-way valve 606 can be adjusted based on conditions detected within a vessel storing build material. In some examples, the three way valve 608 can provide the combination of the gas with the particular humidity level and the ambient air to a zone 1 610 or zone 2 612. In some examples, each zone 610 or 612 can correspond to different vessels storing build material, transport lines for transporting the build material within a 3D printer, and the like. In some examples, the three-way valves 606 and 608 can be controlled by a controller to adjust an amount of conditioning fluid and gas entering each vessel of a 3D printer.

Figure 7:
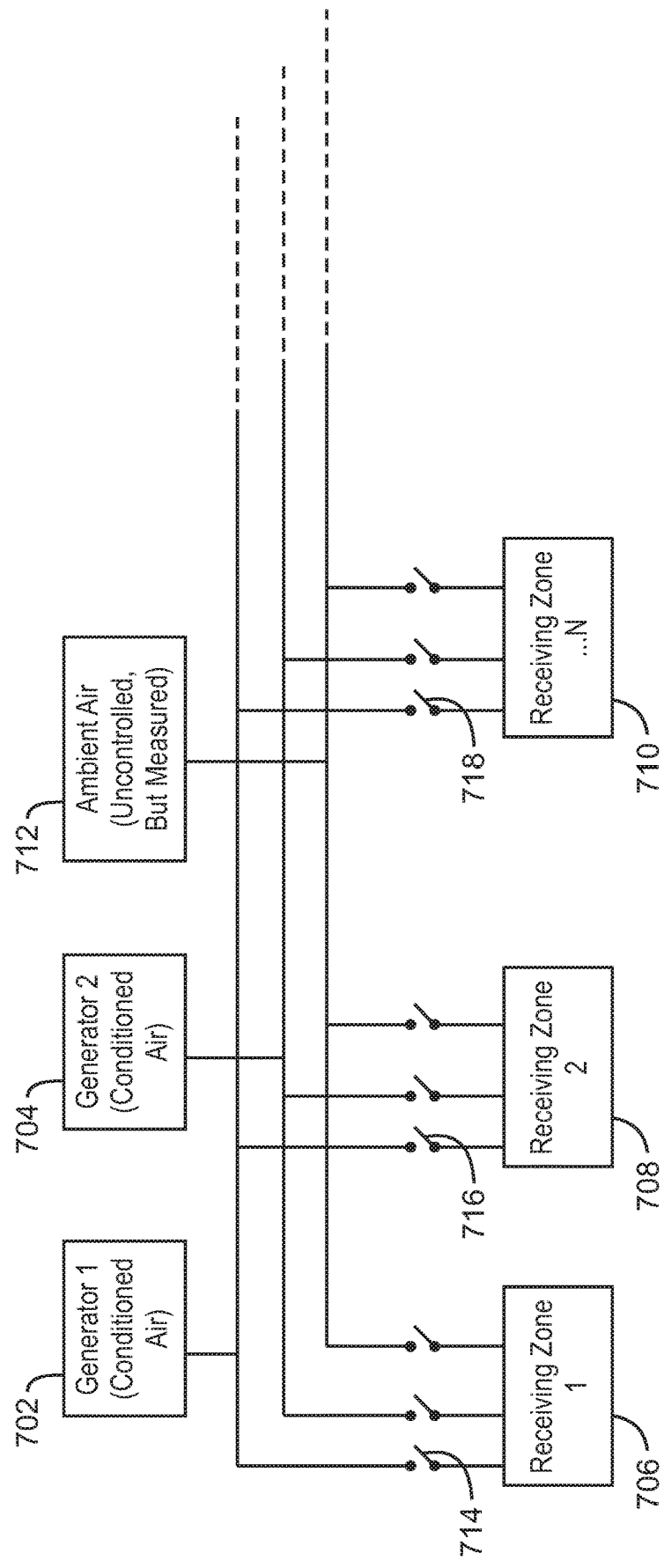
FIG. 7 is an example 3D printer comprising a plurality of conditioning sources in accordance with examples.

FIG. 7 is an example 3D printer comprising a plurality of conditioning sources in accordance with examples. In some examples, a 3D printer 700 can include any suitable number of generators that can generate conditioned air. Conditioned air can include any suitable gas or combination of gases mixed with a conditioning agent such as water vapor or humidified air. In some examples, a generator 1 702 and generator 2 704 can provide conditioned air to any suitable number of zones within the 3D printer 700. As discussed above, each zone of a 3D printer can correspond to separate vessels storing build material, transport lines for transporting the build material, the build enclosure, and any other components within the 3D printer.

In the example of FIG. 7, the 3D printer 700 can include receiving zone 1 706, receiving zone 2 708 through receiving zone N 710. Each receiving zone 706, 708, and 710 can receiving a mixture of conditioned air from generator 1 702, generator 2, 704, and also ambient air 712 that is uncontrolled but measured. In some examples, the ambient air 712 can be provided from any suitable source within the 3D printer 700 or from outside of the enclosure of the 3D printer 700. The mixture of the conditioned air from generator 1 702 and generator 2 704 with the ambient air 712 can be provided to each receiving zone 706, 708, and 710 via sets of valves 714, 716, and 718. Each set of valves 714, 716, and 718 can be controlled by a controller within the 3D printer 700 to provide a mixture of conditioned air from generator 1 702 and generator 2 704 and ambient air 712 based on conditions within each receiving zone 706, 708, or 710. For example, a relative humidity or temperature within each receiving zone 706, 708, and 710 can correspond to a controller selecting a different mixture of conditioned air from generator 1 702 and generator 2 704 along with the ambient air 712. In some examples, characteristics of build material, such as relative humidity, temperature, and permeability, within each receiving zone 706, 708, and 710 can also be detected by a controller of the 3D printer. The characteristics of the build material within each receiving zone 706, 708, and 710 can result in different combinations of conditioned air and ambient air 712 being applied to each of the receiving zones 706, 708, and 710. Accordingly, in some examples, one or more humidity generators 702 and 704 are to connect to one or more of the vessels of a 3D printer to provide the conditioning fluid and the gas that modifies the moisture content level of build material within each vessel.

Figure 8:
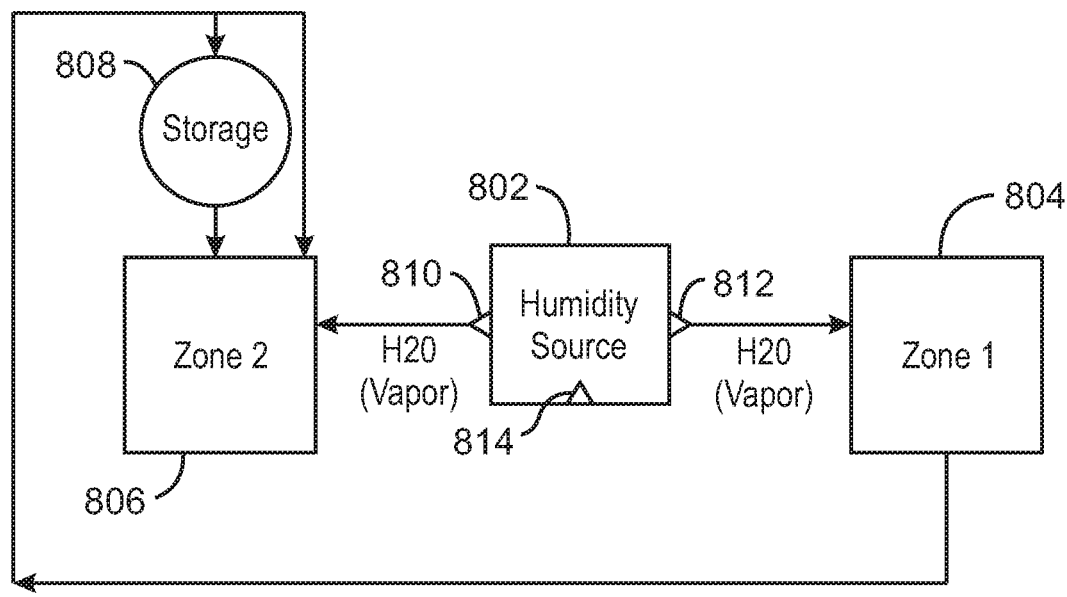
FIG. 8 is an example 3D printer with a humidity source in accordance with examples.

FIG. 8 is an example 3D printer with a humidity source in accordance with examples. In the 3D printer 800, a humidity source 802 can provide any suitable mixture of gases and humidified air or any other suitable conditioning agent to zone 1 804 and zone 2 806. In some examples, zone 1 corresponds to recovered build material vessels and zone 2 corresponds to recycled build material vessels. In some examples, the 3D printer can also include a storage 808 component that stores build material provided to zone 2 806. In some examples, build powder can be transported between zone 1 804 and zone 2 806 or the storage 808 component. Accordingly, the single humidity source 802 can provide conditioned air to zone 1 804 and zone 2 806 to ensure that build material is transported within the 3D printer 800 with particular characteristics such as a temperature, relative humidity, and permeability conducive to 3D printing techniques. In some examples, the storage 808 component or vessel can include build material stored with a high humidity. The build material of the storage 808 component can be provided to at least one vessel in zone 2 806 for storing the build material for manufacturing the three dimensional object. In some examples, temperature and/or relative humidity sensors 810 and 812 can be included at the exits from the humidity source 802 as well as within zone 1 804 and zone 2 806. Additionally, the water temperature of the humidity source 802 can be measured with a water temperature sensor 814 and the sensor values of the temperature and relative humidity sensors 810 and 812 and water temperature sensor 814 can be used as feedback.

Figure 9:
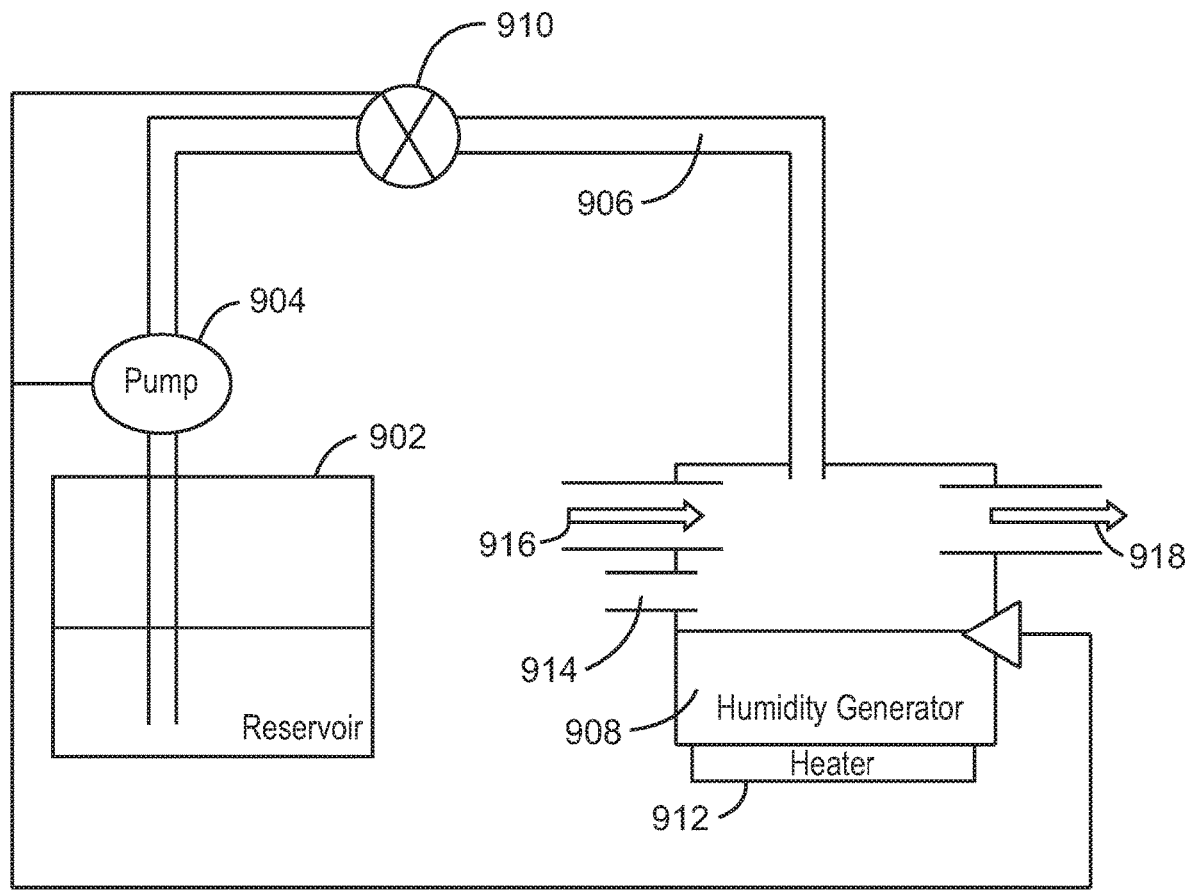
FIG. 9 in an example humidity source for a 3D printer in accordance with examples.

FIG. 9 in an example humidity source for a 3D printer in accordance with examples. The humidity source 900 can include a reservoir or fill tank 902, a pump 904, a water fill 906, and a humidity generator 908. In some examples, the reservoir 902 can be filled with water or any other suitable liquid that can be pumped by the pump 904 through an active valve 910 in the water fill 906 into the humidity generator 908. The active valve 910 can prevent a siphoning effect if the humidity generator 908 is at a lower level than the reservoir 902. In some examples, the humidity generator 908 can be coupled to a heater 912 that can heat the water or fluid received from the reservoir 902. In some examples, the water reservoir 902 can provide water to the humidity generator 908 connected to at least one vessel via a one way conduit, wherein the water reservoir 902 includes a first water level sensor and the humidity generator 908 includes a second water level sensor.

The humidity generator 908 can include a safety overflow 914 in some examples to transport excess water to a location outside of the 3D printer. In some examples, the humidity generator 908 can also include air ports 916 and 918 that enable air to pass through a top portion of the humidity generator 908 and flow into other components of the 3D printer such as storage vessels for build material, transport lines, and the like.

Figure 10:
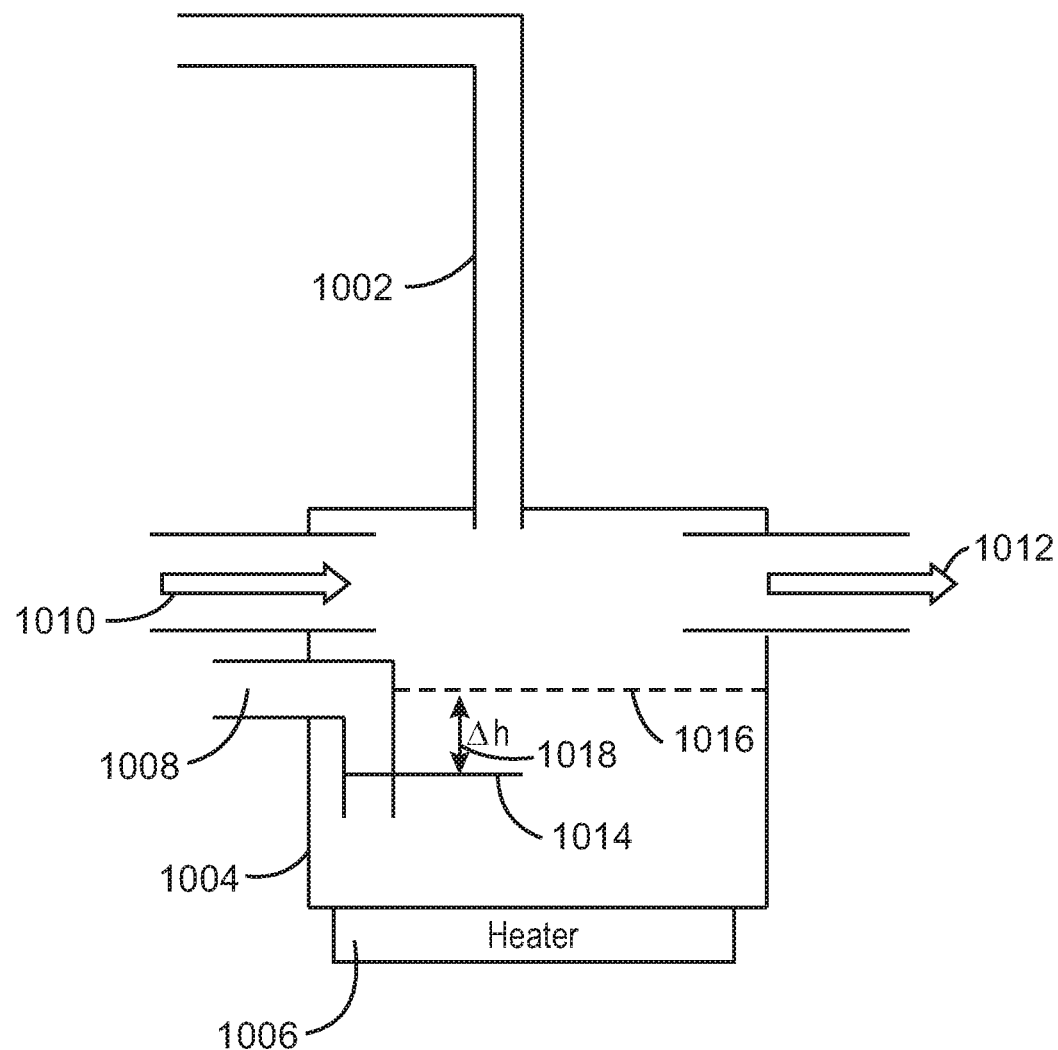
FIG. 10 is an example humidifier component of a 3D printer with a safety overflow feature, in accordance with examples.

FIG. 10 is an example humidifier component of a 3D printer with a safety overflow feature, in accordance with examples. The humidifier component 1000 can include a water fill 1002, a water reservoir 1004, a water heater 1006, a safety overflow feature 1008 (also referred to as a water labyrinth), and air input port 1010, and an air output port 1012. In some examples, the water fill 1002 can transport water to the water reservoir 1004 from a separate water reservoir (not depicted), as discussed above in relation to FIG. 9. In some examples, the water heater 1006 can heat the water stored in the water reservoir 1006 to produce water vapor. In some examples, the water vapor is a conditioning agent that can be added to a gas, such as ambient air that moves through a top of the water reservoir 1004 between the air input port 1010 and the air output port 1012. In some examples, any suitable motive component can force ambient air, or any other suitable gas, from the air input port 1010 to the air output port 1012.

In some examples, the pressure within the water reservoir 1004 can change as a result of the flow of ambient air or gases between the air input port 1010 and the air output port 1012. For example, if there is no air flow between the air input port 1010 and the air output port 1012, then a negative pressure may exist in the water reservoir 1004. The water level within the water reservoir 1004 may be at level 1014 when a negative pressure exists. In some examples, as air flows between the air input port 1010 and the air output port 1012, the pressure within the water reservoir 1004 can change to a positive pressure and the water level can rise to a new level 1016 as depicted by delta h 1018. The safety overflow feature 1008 can prevent water from being forced through the opening 1016 via the safety overflow feature 1008. In some examples, the safety overflow feature 1008 can extend into the water of the water reservoir 1004 to a depth based on the predetermined operating pressure within the water reservoir 1004. In some examples, the safety overflow feature 1008 can also prevent a gas with a conditioning agent from escaping through the safety overflow feature into the system. For example, the safety overflow feature 1008 can ensure that water vapor exits the water reservoir through the air output port 1012 rather than escaping through an opening in a side of the water reservoir 1004 corresponding to water overflow.

Figure 11A:
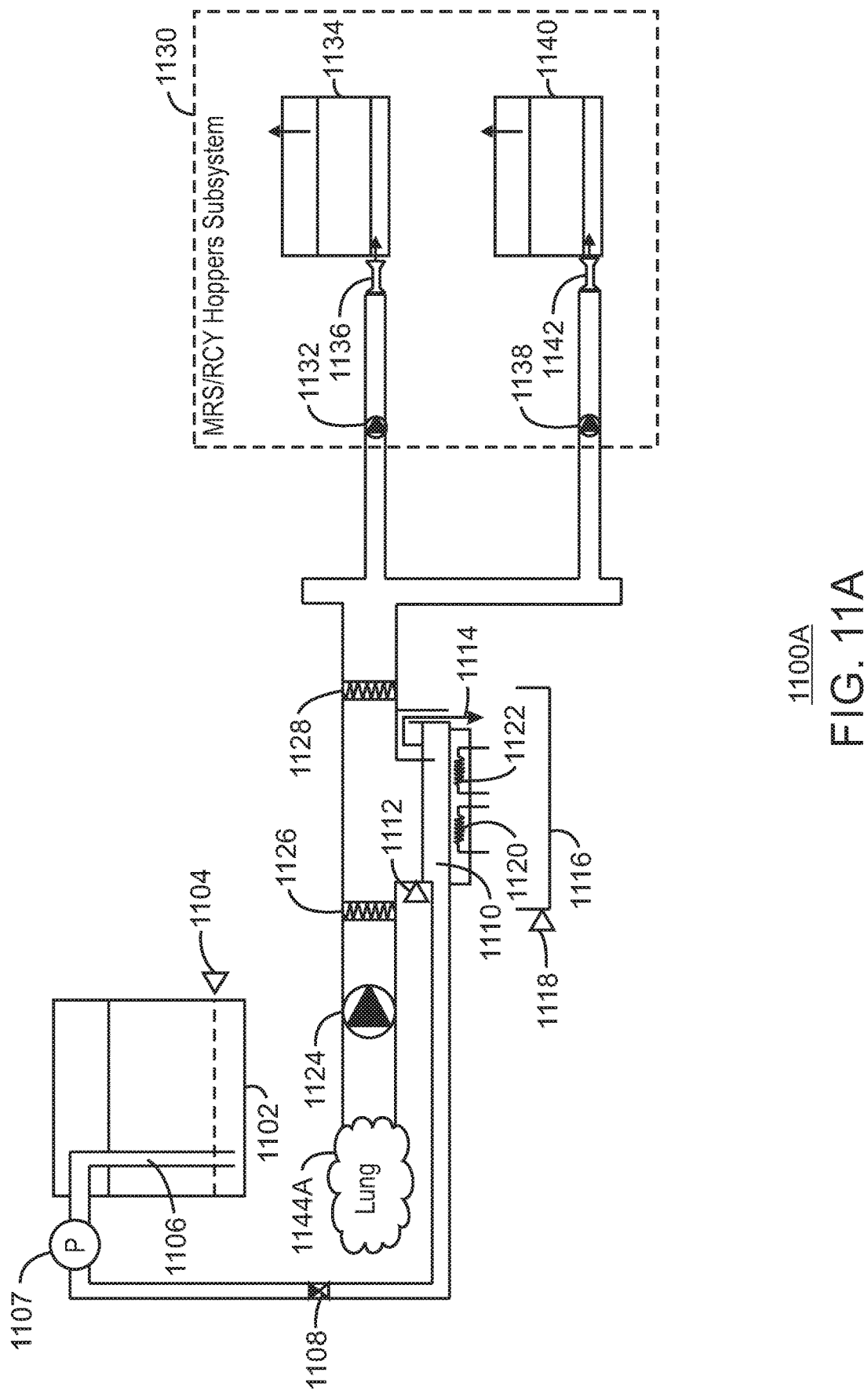
FIGS. 11A, 11B, and 11C are examples of humidifier components circulating air from different sources in a 3D printer, in accordance with examples.
Figure 11B:
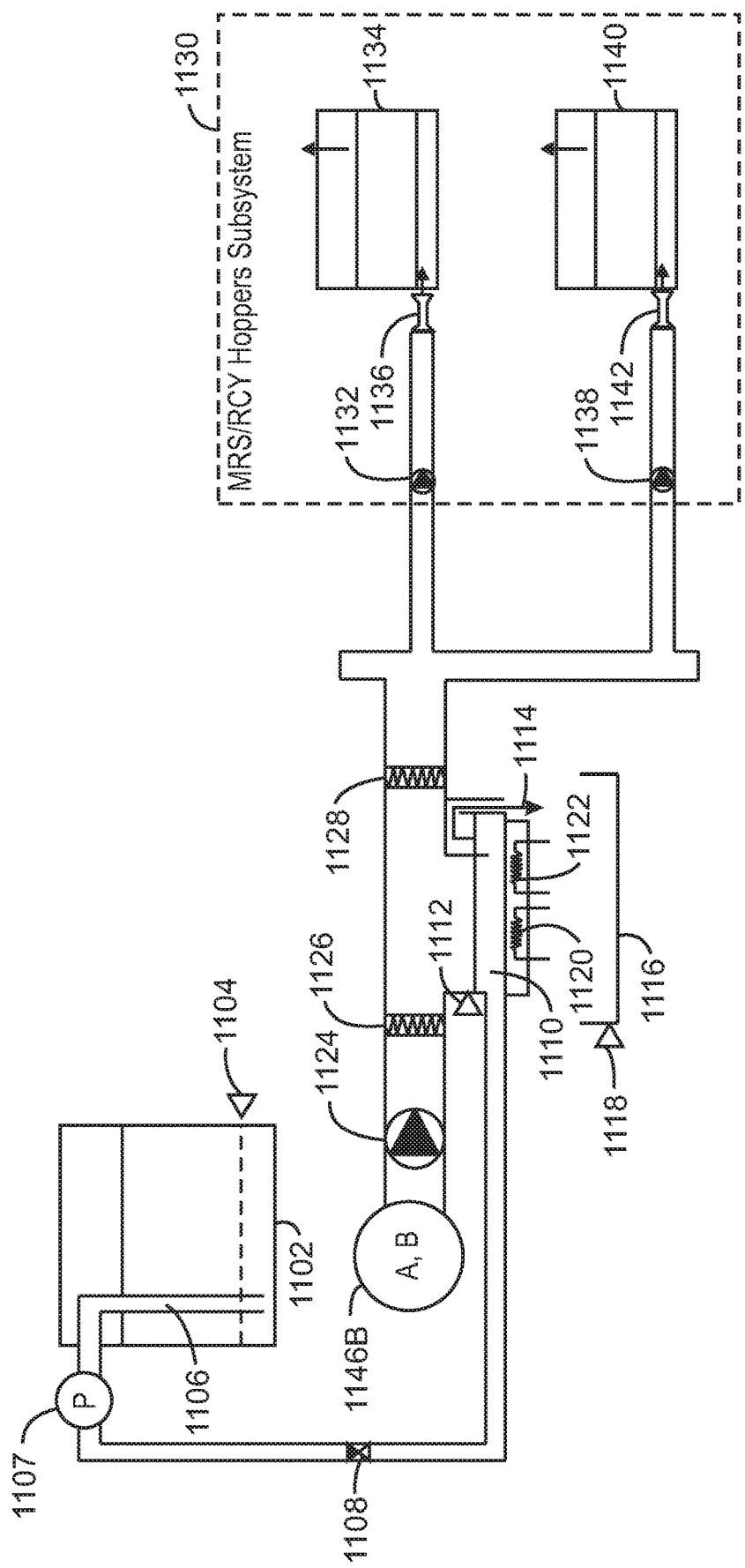
Figure 11C:
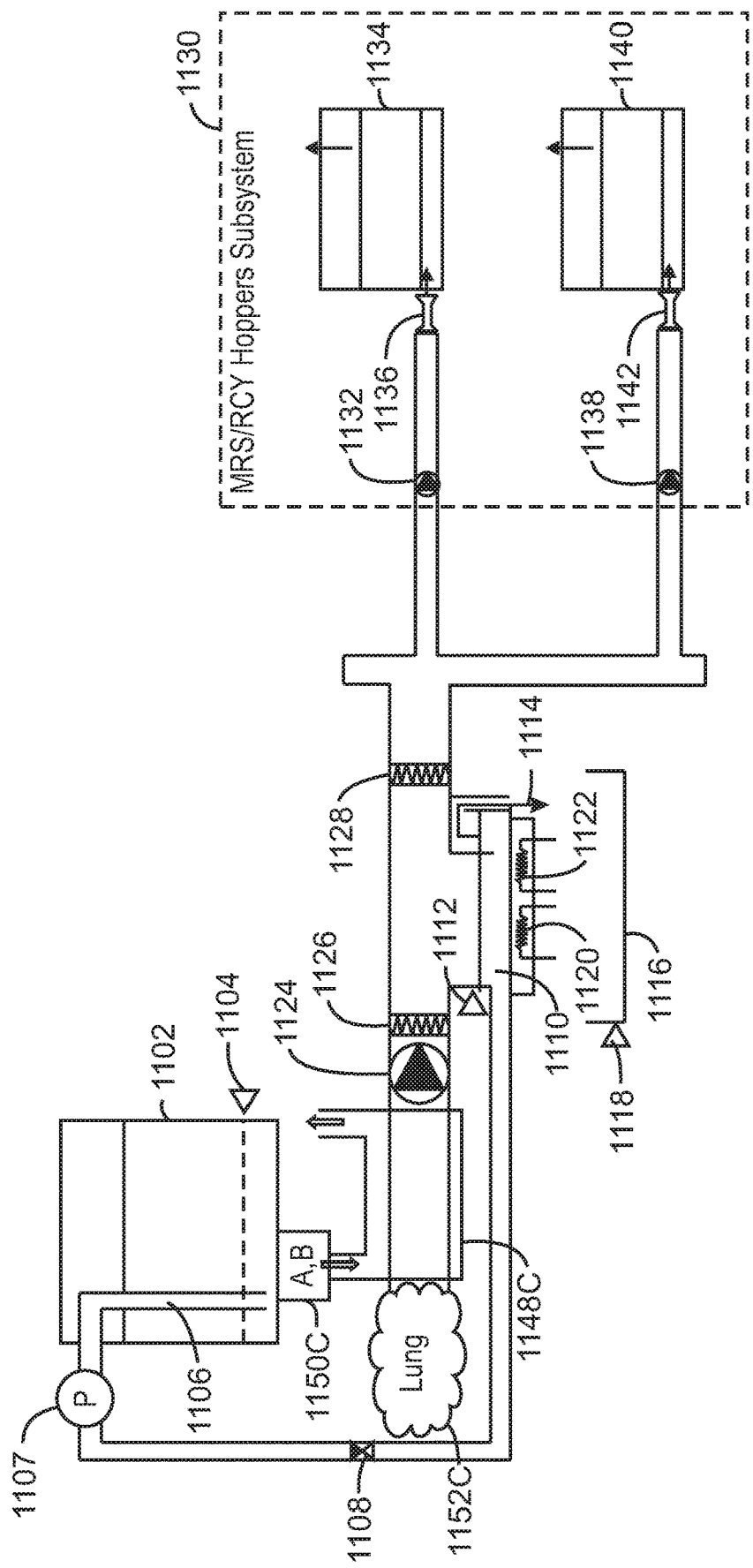

FIGS. 11A, 11B, and 11C are examples of humidifier components in a 3D printer circulating air from different sources, in accordance with examples. In FIG. 11A, a humidifier system 1100A can include a refillable water tank 1102 that can be coupled to a water level sensor 1104 and a conduit 1106 that transports water from the refillable water tank 1102 through a pump 1107 and an active valve 1108 to a water reservoir 1110. In some examples, the water reservoir 1110 can be coupled to a separate water level sensor 1112 that can be monitored by a controller coupled to the humidifier component to prevent an excessive amount of water from being pumped from the refillable water tank 1102 to the water reservoir 1110. In some examples, the water reservoir 1110 can include an overflow feature 1114 that transports excess water to a drain pan 1116 coupled to a leakage sensor 1118. The leakage sensor 1118 can indicate when an excessive amount of water is stored in the water reservoir 1110 resulting in water flowing through the overflow feature 1114 into the drain pan 1116.

In some examples, the water reservoir 1110 can be coupled to water heaters 1120 and 1122 that can heat the water in the water reservoir 1110 to generate water vapor. A fan 1124 can blow or circulate ambient air or gas through an air heater 1126, a top of the water reservoir 1110, and through a separate air heater 1128. The fan 1124 can transport water vapor from the top of the water reservoir 1110 into a vessel subsystem 1130. For example, the fan 1124 can force water vapor into a motive component 1132 providing the water vapor to a new material vessel 1134 via venturi 1136. The venturi 1136 can measure a flow through a conduit line. Similarly, the fan 1124 can force water vapor into a motive component 1138 providing the water vapor to a recycled material vessel 1140 via venturi 1142.

In some examples, the fan 1124 can receive ambient air or a gas from a lung 1144A. The lung 1144A can provide ambient air or any suitable gas or mixture of gases from an external location that is outside of the 3D printer enclosure housing the 3D printer components.

In FIG. 11B, a humidifier system 1100B can include humidifier components 1102-1142 of FIG. 11A discussed above. The fan 1124 of humidifier system 1100B can provide ambient air or a mixture or gases from at least one source within a 3D printer enclosure. For example, a combination of sources A and B 1146B can provide ambient air or a mixture of gases from a build enclosure of a 3D printer, from vessels for storing build material, and the like.

In FIG. 11C, a humidifier system 1100C can include humidifier components 1102-1142 of FIG. 11A discussed above. The fan 1124 of humidifier system 1100C can provide ambient air or a mixture or gases from at least one source within a 3D printer enclosure via a shell heat exchanger 1148C. For example, a combination of sources A and B 1150C can provide ambient air or a mixture of gases from a build enclosure of a 3D printer, from vessels for storing build material, and the like. A shell heat exchanger 1148C can filter any loose build material, such as powder, from the combination of sources A and B 1150C to provide warm air to fan 1124 free of loose build material. In some examples, a lung 1152C can also provide ambient air to the fan 1124. In some examples, the shell heat exchanger 1148C can remove loose build material from a heat source in the system and transfer heat from the heat source to the gas, wherein the fan 1124 blows a second heated gas or conditioning fluid on a second side of the heat exchanger 1148C through a humidity generator and into at least one vessel.

Figure 12:
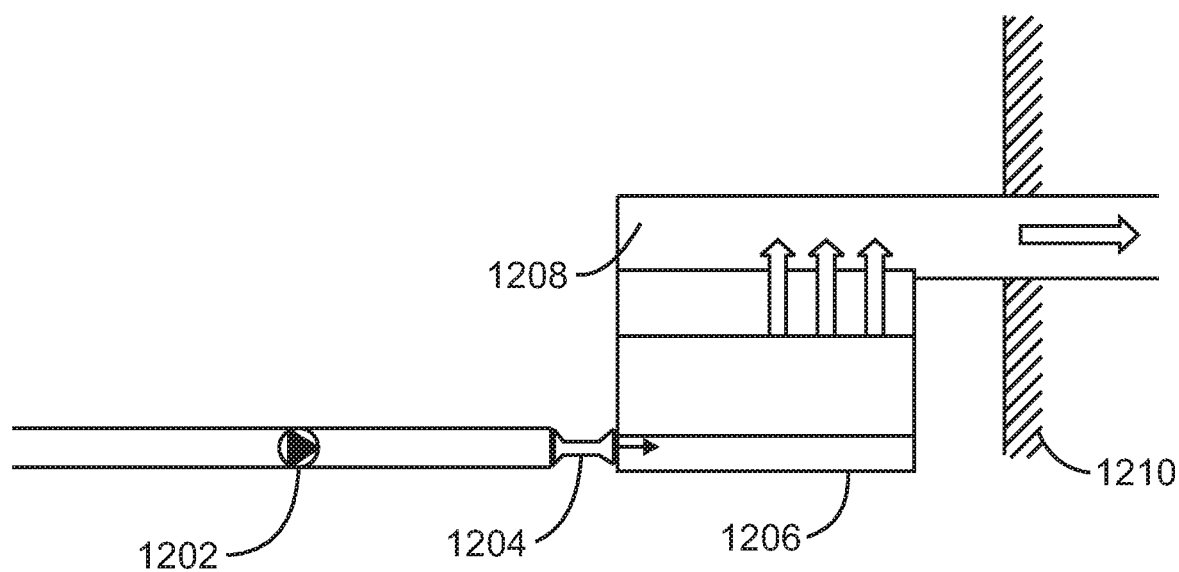
FIG. 12 is an example of transporting excess vapor from a vessel storing build material to a location outside of the vessel.

FIGS. 12, 13, 14, and 15 are examples of transporting excess vapor from a vessel storing build material to a location outside of the vessel. In FIG. 12, a 3D printer 1200 can include a motive component 1202, such as a blower or a fan, which can provide ambient air, a gas, or a mixture of gases through a venturi 1204 to a vessel 1206. The vessel 1206 can store any suitable build material such as recycled build material, non-recycled or new build material, recovered material, and the like. In some examples, the motive component 1202 provides conditioned air comprising water vapor to the vessel 1206. In some examples, excess water vapor can accumulate in a top of the vessel 1206. A conduit 1208 can transport excess vapor from the top of the vessel 1206 to a location beyond a product wall 1210 of the 3D printer 1200. Accordingly, the conduit 1208 can transport excess water vapor to a location outside of the 3D printer 1200.

Figure 13:
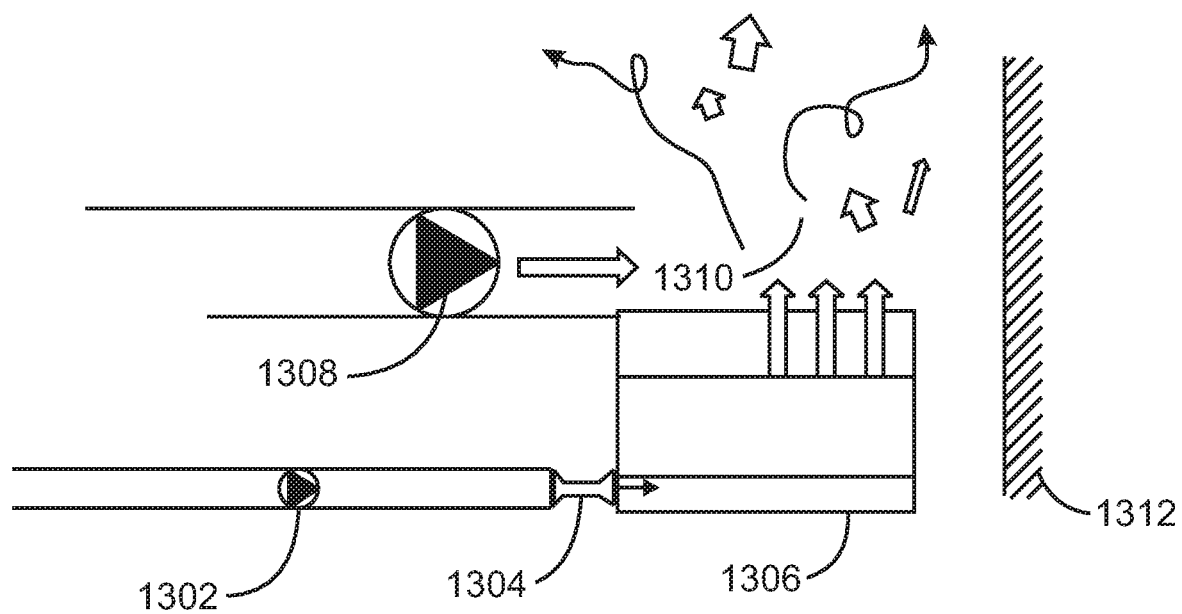
FIG. 13 is an example of transporting excess vapor from a vessel storing build material to a location outside of the vessel.

In FIG. 13, a 3D printer 1300 can include a motive component 1302, such as a blower or a fan, which can provide ambient air, a gas, or a mixture of gases through a venturi 1304 to a vessel 1306. The vessel 1306 can store any suitable build material such as recycled build material, non-recycled or new build material, recovered material, and the like. In some example, a fan 1308 can disperse exhaust water vapor 1310 within a product wall 1312 of the 3D printer 1300. For example, the fan 1308 can provide ambient air or gases that are mixed with the exhaust water vapor 1310 to disperse the exhaust water vapor within the 3D printer 1300.

Figure 14:
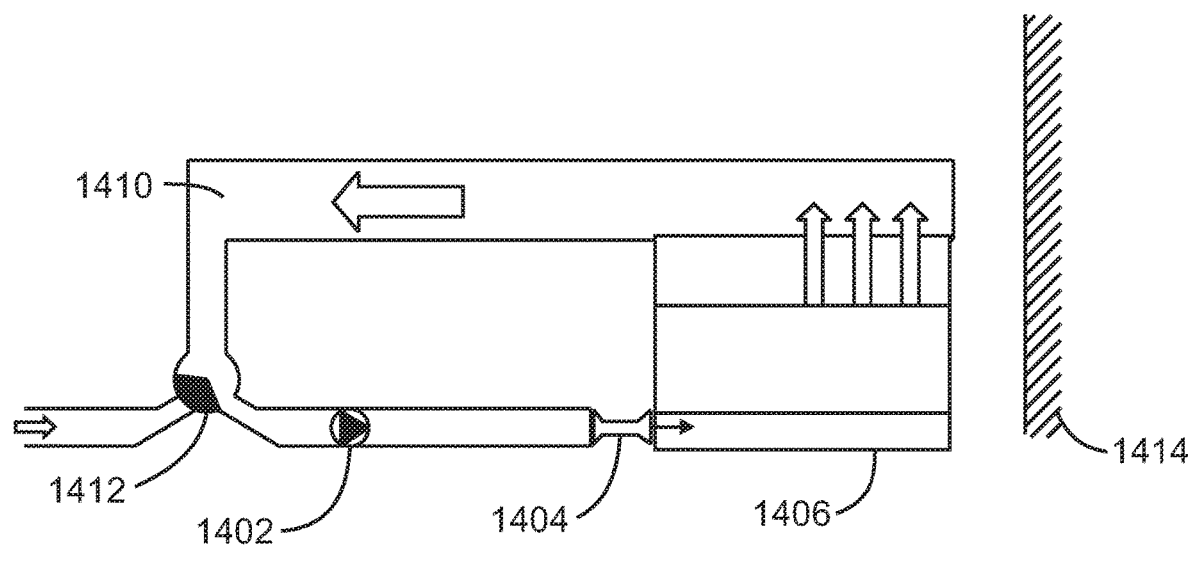
FIG. 14 is an example of recirculating excess vapor from a vessel.

In FIG. 14, a 3D printer 1400 can include a motive component 1402, such as a blower or a fan, which can provide ambient air, a gas, or a mixture of gases through a venturi 1404 to a vessel 1406. The vessel 1406 can store any suitable build material such as recycled build material, non-recycled or new build material, recovered material, and the like. In some example, a conduit 1408 can transport excess water vapor to a three-way valve 1412 that can mix air from other sources with the exhaust water vapor and provide the mixture to the fan 1402. In some examples, the other sources of air can include a lung, a humidifier system, and the like. Accordingly, the conduit 1408 can recirculate the excess water vapor within the 3D printer 1400 without allowing the excess water vapor to escape the product wall 1414.

Figure 15:
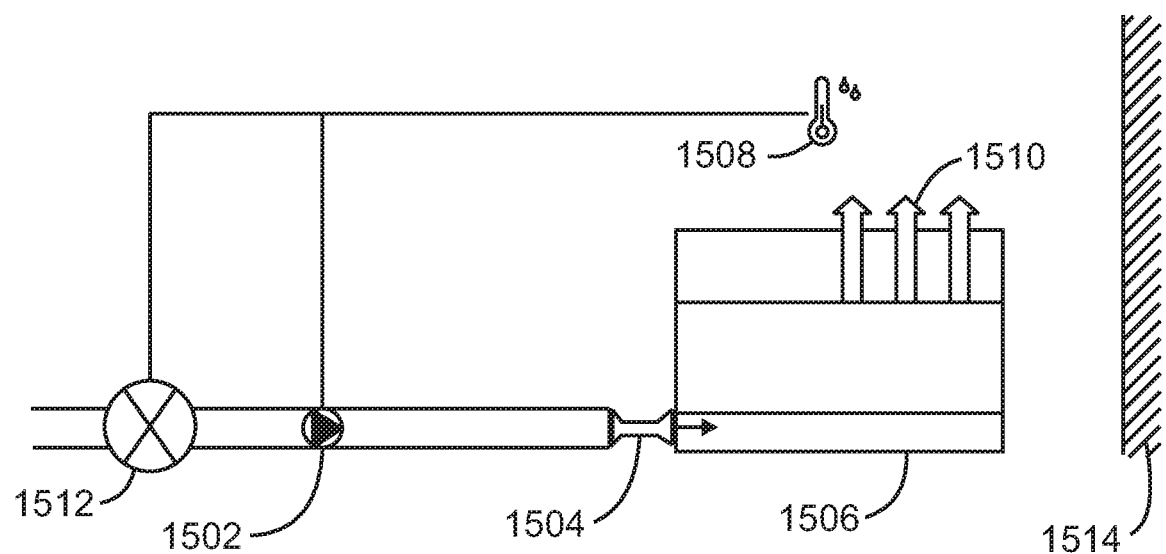
FIG. 15 is an example of transporting excess vapor from a vessel storing build material to a location outside of the vessel.

In FIG. 15, a 3D printer 1500 can include a motive component 1502, such as a blower or a fan, which can provide ambient air, a gas, or a mixture of gases through a venturi 1504 to a vessel 1506. The vessel 1506 can store any suitable build material such as recycled build material, non-recycled or new build material, recovered material, and the like. In some example, a relative humidity sensor 1508 can reside proximate a top of the vessel 1506. The relative humidity sensor 1508 can detect an amount of excess water vapor 1510 exiting the top of the vessel 1506. A controller (not depicted) within the 3D printer 1500 can detect sensor values from the relative humidity sensor 1508 and can control a valve 1512 to adjust an amount of conditioned air provided to the vessel 1506. Accordingly, the valve 1512 can reduce or increase an amount of water vapor 1510 within the vessel 1506 based on sensor values detected from the relative humidity sensor 1508. In some examples, a controller can adjust an amount of conditioning agent applied to the gas entering the valve 1512 in response to a change in the humidity level of the excess vapor 1510. For example, a humidity level of conditioned air provided to the valve 1512 can be increased or decreased. In some examples, the excess water vapor circulates within the product wall 1514.

Figure 16:
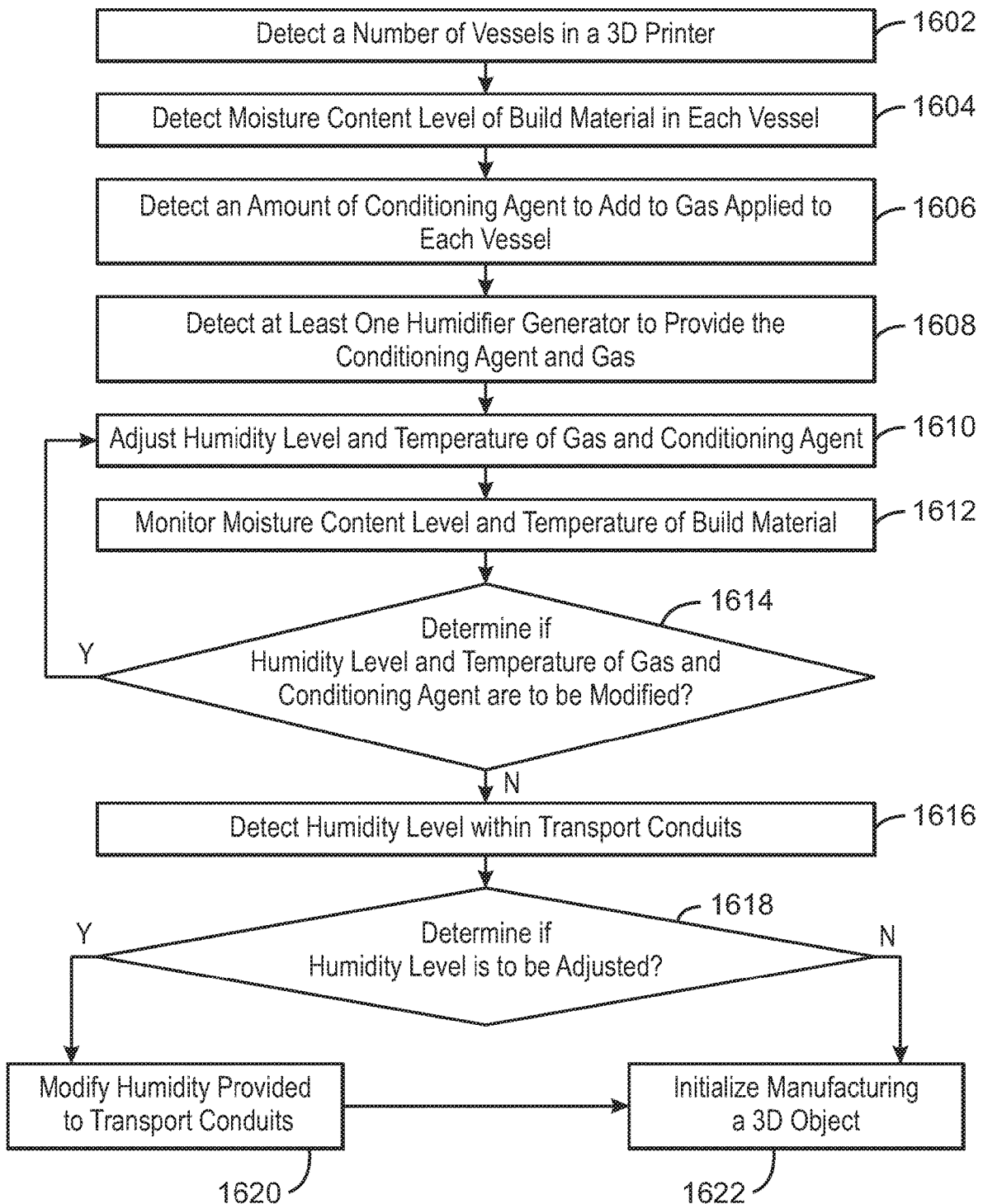
FIG. 16 is an example process flow diagram, in accordance with examples.

FIG. 16 is an example process flow diagram, in accordance with examples. The method begins at block 1602 when a controller, such as controller 1800 of FIG. 18 or controller 312 of FIG. 4, can detect a number of vessels in a 3D printer. For example, any suitable number of vessels can be included in the 3D printer for storing recycled build material, non-recycled build material, or recovered build material. In some examples, a 3D printer can include multiple vessels for each type of build material.

At block 1604, the controller can detect a moisture content level corresponding to a build material residing in each of the plurality of vessels. For example, the controller can detect a sensor value from a relative humidity and temperature sensor indicating a moisture content level of build material stored in a vessel. In some examples, the moisture content level for the build material in each vessel can be different.

At block 1606, the controller can detect an amount of a conditioning agent to add to a gas applied to each vessel that results in a predetermined humidity level of the gas and conditioning agent. For example, the controller can detect a humidity level of the gas and conditioning agent to apply to each vessel. In some examples, the humidity level can be based on a type of the build material within a vessel. The conditioning agent can be water vapor or any other suitable liquid or gas that increases the humidity within a vessel. As described above in relation to FIGS. 4 and 5, the conditioning agent can be added to a gas by a humidifier generator that heats water to provide water vapor to a gas that is applied to a vessel. In some examples, build material that has been recycled from the building enclosure can be stored in a separate vessel from new build material that has not entered the building enclosure. In some examples, each type of build material may receive a different level of humidity with the gas.

At block 1608, the controller can detect a humidifier generator or a combination of multiple humidifier generators to provide the conditioning agent and gas to each vessel. As discussed above in relation to FIG. 7, each vessel can be connected to any suitable number of humidifier generators. Accordingly, a mixture of conditioning agents and gases from each humidifier generator can be applied to each vessel. Additionally, in some examples, ambient air can also be provided to each vessel. A mixture of the ambient air and conditioning agents and gases from each humidifier generator can provide the predetermined humidity level to each vessel.

At block 1610, the controller can adjust a humidity level and/or a temperature of a gas and a conditioning agent applied to each vessel, wherein the humidity level and the temperature are based on the moisture content level and a temperature of the build material residing in each vessel. In some examples, the controller can control air humidity and temperature independently. For example, any suitable number of valves, such as the three way valve of FIG. 6, can mix ambient air and gas with a conditioning agent and provide the mixture to each vessel. In some examples, each vessel can receive a different mixture of ambient air and gases with a conditioning agent based on the type of build material in the vessels. In some examples, the gas and conditioning agent are applied to each vessel at a rate below a fluidization rate. The fluidization rate, as referred to herein, can indicate a rate of a gas entering a vessel that results in build material within the vessel behaving as a fluid. In some examples, the gas can enter a vessel from any suitable number of points and the gas can be introduced to the build material without displacing the build material. In some examples, the fluidization rate indicates a rate of gas that begins to displace the build material in a vessel.

At block 1612, the controller can monitor the moisture content level and temperature of the build material to determine if the humidity level and temperature of the gas and conditioning agent are to be modified. For example, a relative humidity and temperature sensor can reside at a top of each vessel to indicate an amount of vapor escaping the vessel. As discussed above in relation to FIG. 15, a valve can control the flow of conditioning agent and gas into the vessel to maintain the vapor within a fixed range.

At block 1614, the controller can determine if the humidity level and temperature of the gas and conditioning agent are to be modified. For example, a humidity level and temperature of the gas can be adjusted by any suitable number of water heaters and the like. In some examples, the humidity level and temperature of the gas and conditioning agent are to be modified if a moisture content level of build material in a vessel is not within a predetermined range. If the humidity level and temperature of the gas and conditioning agent are to be modified, the process returns to block 1610. If the humidity level and temperature of the gas and conditioning agent are not to be modified, the process continues at block 1616.

At block 1616, the controller can detect a humidity level within the transport conduits carrying the build material from each vessel to a build enclosure. For example, an HTA system can provide humidity to the transport conduits carrying build material between vessels and a build enclosure. As illustrated in FIG. 4, the HTA system can include a water heater that can provide water vapor to the transport conduits.

At block 1618, the controller can determine if the humidity level of the transport conduit lines is to be adjusted to decrease tribocharging of build material. For example, the humidity level can be increased to reduce tribocharging or decreased if an excessive amount of moisture accumulates in the transport conduits. If the humidity level of the transport conduits is to be decreased, the process continues at block 1620. If the humidity level of the transport conduits is not to be decreased, the process continues at block 1622. At block 1620, the controller can adjust the HTA to modify the humidity or amount of water vapor provided to the transport conduit lines so that the build material moisture content level is within a predetermined range.

At block 1622, the controller can initialize manufacturing a three dimensional object with the build material from at least one of the plurality of vessels in response to detecting the moisture content level of the build material residing in the at least one vessel is within a predetermined range. For example, the controller can determine that a three dimensional object is to be manufactured in a build enclosure of the three dimensional printer with any combination of new build material and recycled build material. The controller can determine that the moisture content level of the new build material, recycled build material, and/or recovered build material is within a predetermined range. Accordingly, the controller can determine that the three dimensional object can be manufactured with the new build material, recycled build material, and/or recovered build material without a tribocharging effect.

Figure 17:
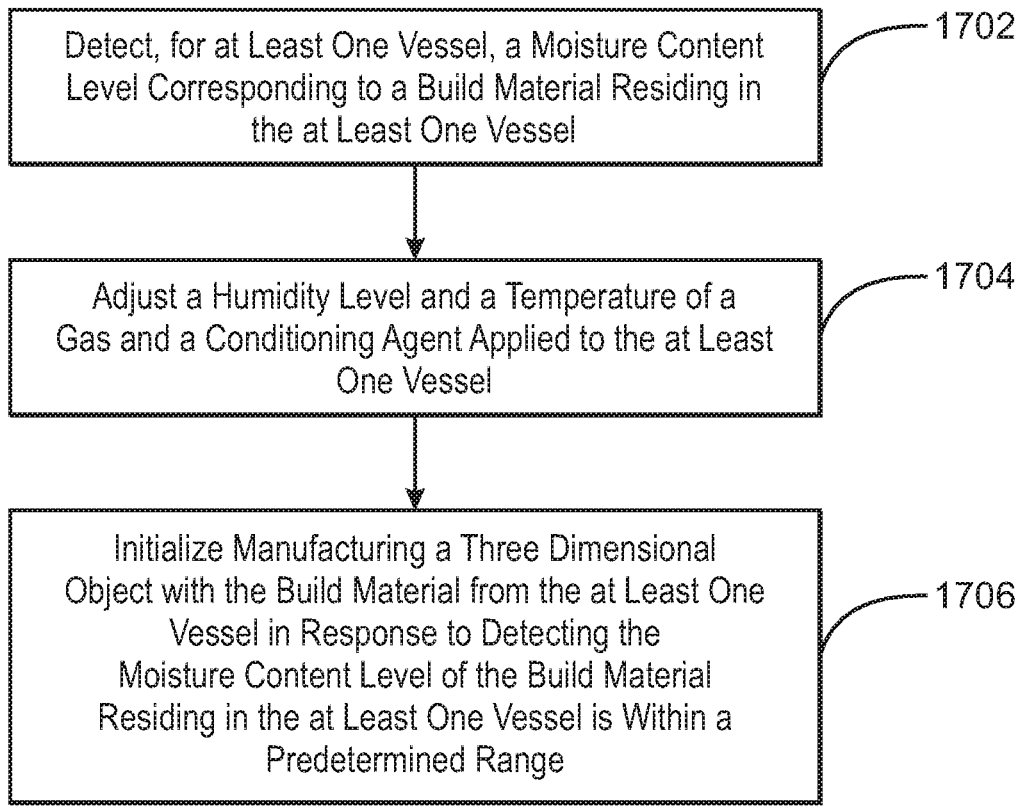
FIG. 17 is an example process flow diagram in accordance with examples.

FIG. 17 is an example process flow diagram in accordance with examples. The method begins at block 1702 when a controller can detect, for at least one vessel, a moisture content level corresponding to a build material residing in the at least one vessel. In some examples, the build material can include any suitable powder, among other substances, that can be used to manufacture a three dimensional object. For example, the build material can be a granular material with a narrow size distribution, such as beads, or other shapes of small solids that may flow and be conveyed in an air stream. As discussed above, "powder" as a build material can, for example, refer to a powdered, or powder-like, material which may be layered and sintered via an energy source or fused via a fusing agent, or a fusing agent and energy source in a 3D printing job. In some examples, the build material may be formed into a shape using a chemical binder, such as a solvent binder or a reaction promoter. The build material can be, for example, a semi-crystalline thermoplastic material, a metal material, a plastic material, a composite material, a ceramic material, a glass material, a resin material, or a polymer material, among other types of build material.

In some examples, the moisture content level can indicate a permeability of a build material or a flow rate that results in gas passing through the build material. In some examples, the moisture content level is detected by a relative humidity sensor residing at a bottom of a vessel. The build material in each vessel can have a different moisture content level.

At block 1704, a controller can adjust a humidity level and a temperature of a gas and a conditioning agent applied to the vessel, wherein the humidity level and the temperature are based on the moisture content level and a temperature of the build material residing in the vessel. In some examples, the vessel can include a temperature sensor in the bottom of the vessel to detect a temperature of the build material in addition to a relative humidity of the build material detected by the relative humidity sensor. In some examples, a humidity sensor can measure the relative humidity of the air. The moisture content of build material can be inferred based on characterizations of the build material such as temperature, permeability, and the like. In some examples, the conditioning agent can be water vapor or any other suitable liquid vapor that results in an increase or decrease of a humidity level in each vessel. Accordingly, the gas combined with the conditioning agent can result in changing a moisture content level and temperature of build material stored in a vessel.

In some examples, the humidity level and temperature of the gas is based on a time to increase the moisture content level of the build material. For example, the controller can apply the gas with a particular humidity level to the vessel for a minimal period of time to result in the build material reaching a target moisture content level. In some examples, the moisture content level corresponds to an amount of humidity to enter the vessel within a period of time that results in the moisture content of the build material reaching the target level.

At block 1706, a controller can initialize manufacturing a three dimensional object with the build material from the vessel in response to detecting the moisture content level of the build material residing in the at least one vessel is within a predetermined range. In some examples, the controller can adjust the humidity level of the gas and the conditioning agent to a lower humidity level in response to detecting an excess amount of vapor accumulating within a vessel. For example, the controller can reduce the amount of moisture entering the vessel with the gas to prevent excess vapor from accumulating within a top of the vessel. Accordingly, the controller can modify the humidity level of the gas applied to the vessel during the manufacturing of a three dimensional object to ensure that the build material has a moisture content level within a predetermined range.

Figure 18:
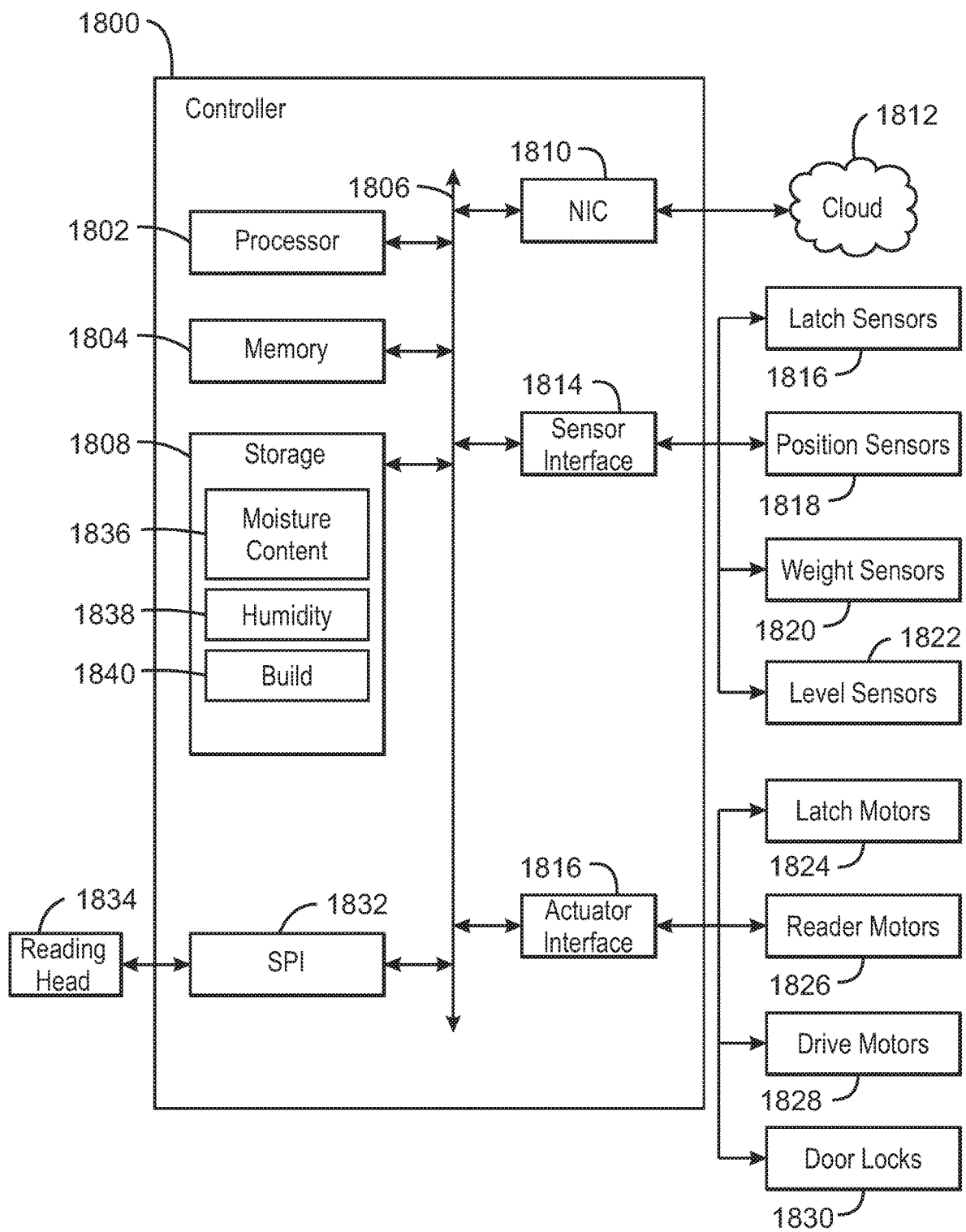
FIG. 18 is an example controller for operating a 3D printer, in accordance with examples.

FIG. 18 is an example controller for operating a 3-dimensional printer, in accordance with examples. The controller 1800 may be part of the main controller for the 3D printer.

The controller 1800 may include a processor 1802, which may be a microprocessor, a multi-core processor, a multi-threaded processor, an ultra-low voltage processor, an embedded processor, or other type of processor. The processor 1802 may be an integrated microcontroller in which the processor 1802 and other components are formed on a single integrated circuit board, or a single integrated circuit, such a system on a chip (SoC). As an example, the processor 1802 may include a processor from the Intel® Corporation of Santa Clara, Calif., such as a Quark™, an Atom™, an i3, an i5, an i7, or an MCU-class processor. Other processors that may be used may be obtained from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 1802 may communicate with a system memory 1804 over a bus 1806. Any number of memory devices may be used to provide for a given amount of system memory. The memory may be sized between about 2 GB and about 64 GB, or greater. The system memory 1804 may be implemented using non-volatile memory devices to protect from power loss, such as static RAM (SRAM), or memory modules having backup power, for example, from batteries, super-capacitors, or hybrid systems.

Persistent storage of information such as data, applications, operating systems, and so forth, may be performed by a mass storage 1808 coupled to the processor 1802 by the bus 1806. The mass storage 1808 may be implemented using a solid-state drive (SSD). Other devices that may be used for the mass storage 1808 include flash memory cards, such as SD cards, microSD cards, xD picture cards, and the like, and USB flash drives. In some examples, the controller 1800 may have an accessible interface, such as a USB connection, an SD card socket, or a micro-SD socket to all the insertion of memory devices with build plans, instructions, and the like.

In some examples, the mass storage 1808 may be implemented using a hard disk drive (HDD) or micro HDD. Any number of other technologies may be used in examples for the mass storage 1808, such resistance change memories, phase change memories, holographic memories, or chemical memories, among others.

The components may communicate over the bus 1806. The bus 1806 may include any number of technologies, such as industry standard architecture (ISA), extended ISA (EISA), peripheral component interconnect (PCI), peripheral component interconnect extended (PCIx), PCI express (PCIe), or any number of other technologies. The bus 1808 may include proprietary bus technologies, for example, used in a SoC based system. Other bus systems may be included, such as an I2C interface, I3C interface, an SPI interface, point to point interfaces, and a power bus, among others. A network interface controller (NIC) 1810 may be included to provide communications with a cloud 1812 or network, such as a local area network (LAN), a wide area network (WAN), or the Internet.

The bus 1806 may couple the processor 1802 to interfaces 1814 and 1816 that are used to connect to other devices in the 3D printer. For example, a sensor interface 1814 may be used to couple to latch sensors 1816 to detect if a build material container is latched in a supply station, and position sensors 1818 to detect if a build material container is in a base position in a supply station. Other sensors that may be present in examples include weight sensors 1820 to determine the weights of various containers or vessels, such as the supply stations, the new material vessel, the recycle material vessel, or the recovered material vessel, among others. Level sensors 1822 may be coupled to the sensor interface 1814 to monitor the level of build material in various vessels, such as the new material vessel, the recycle material vessel, or the recovered material vessel, among others.

An actuator interface 1816 may be included to control various actuators in the 3D printer. The actuators may include latch motors 1824, to release build material containers from supply stations, and reader motors 1826 to move reading heads towards, and away from, information chips on build material containers. Drive motors 1828 may be used to rotate cylindrical cages that hold build material containers. The drive motors 1828 may be stepper motors, server motors, or other kinds of motors that have rotation controlled by the supplied power signal, allowing the number of revolutions per minute in total revolutions to be controlled by the actuation. In some examples, a sensor may be used to determine the number of revolutions, for example, the position sensors 1818 may be used to count the number of revolutions of the cylindrical cage in the new supply station or the recycle supply station. The actuation interface 1816 may also couple to door locks 1830 which may be used to lock the doors to prevent access to the build material containers while they are being moved.

A serial peripheral interface (SPI) 1832 may be coupled to the reading head 1834 for interface with an information chip. Other types of interfaces may also be used to read the information chip, such as a two wire 120 serial bus. In some examples, the information chip may be accessed through an RFI system.

While not shown, various other input/output (I/O) devices may be present within, or connected to, the controller 1800. For example, a display panel may be included to show information, such as build information, action prompts, warnings of incorrect material, or messages concerning status of doors, build material containers, and the like. Audible alarms may be included to alert a user of a condition. An input device, such as a touch screen or keypad may be included to accept input, such as instructions on new builds, and the like.

The mass storage 1808 may include modules to control the supply stations, as described herein. Although shown as code blocks in the mass storage 1808, it may be understood that any of the modules may be fully or partially implemented in hardwired circuits, for example, built into an application specific integrated circuit (ASIC). The modules may generally be used to implement the functions described with respect to FIGS. 16 and 17.

In some examples, a moisture content module 1836 may implement the general functions for detecting, for a plurality of vessels, a moisture content level corresponding to a build material residing in each of the plurality of vessels. In some examples, a humidity module 1838 may adjust a humidity level and a temperature of a gas and a conditioning agent applied to each vessel, wherein the humidity level and the temperature are based on the moisture content level and a temperature of the build material residing in each vessel.

Other functions may be present, including, for example, a build module 1842. The build module 1842 may direct the build procedure for forming the 3D object. For example, the build module 1842 may initialize manufacturing a three dimensional object with the build material from at least one of the plurality of vessels in response to detecting the moisture content level of the build material residing in the at least one vessel is within a predetermined range.

Figure 19:
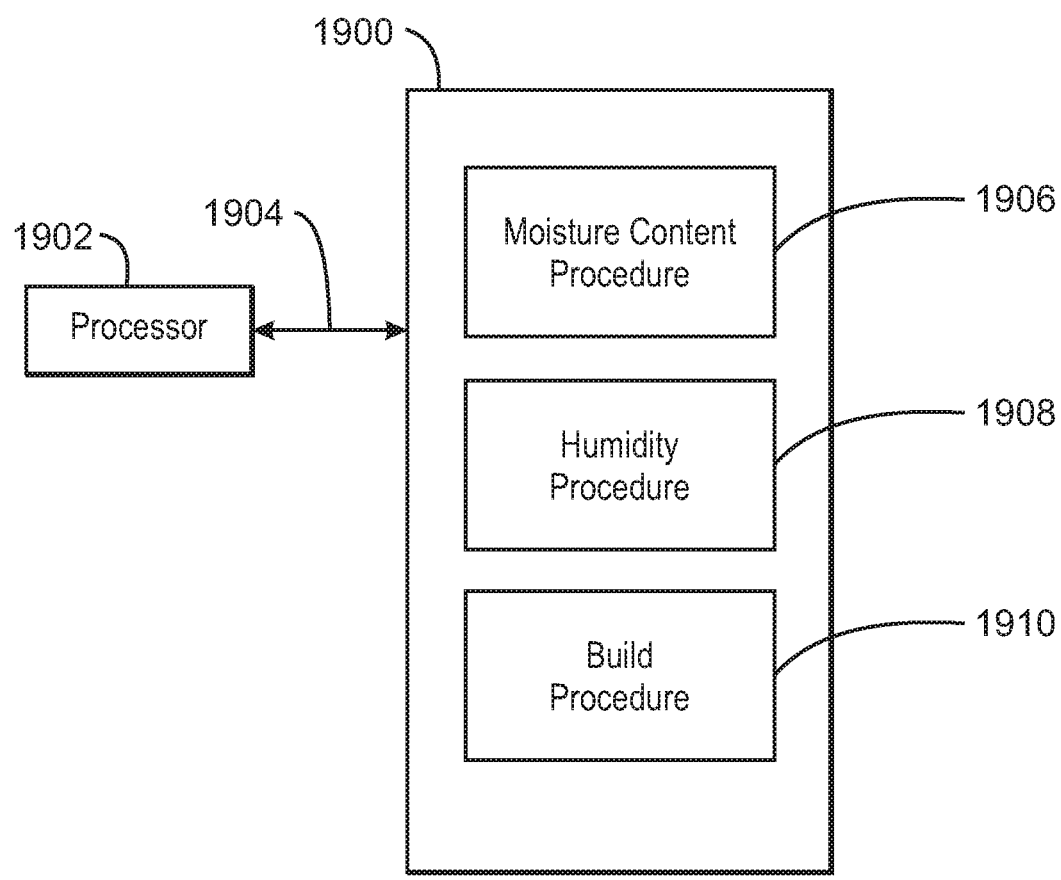
FIG. 19 is a block diagram of a non-transitory, machine-readable medium attached to a 3D printer, in accordance with examples.

FIG. 19 is a block diagram of a non-transitory, machine-readable medium attached to a 3-dimensional printer, in accordance with examples. Like numbered items are as described with respect to previous figures. The non-transitory, machine readable medium 1900 may implement the functionalities of the controller 1800 of FIG. 18. A processor 1902, for example, in a control system of a three dimensional printer, may access the non-transitory, machine readable medium 1900, as indicated by arrow 1904.

The non-transitory, machine readable medium 1900 may include code 1906 to direct the processor 1902 to implement a moisture content procedure 1906 such as detecting, for a plurality of vessels, a moisture content level corresponding to a build material residing in each of the plurality of vessels. The non-transitory, machine readable medium 1900 may also include parameters for a humidity procedure 1908, which may include adjusting a humidity level and a temperature of a gas and a conditioning agent applied to each vessel, wherein the humidity level and the temperature are based on the moisture content level and a temperature of the build material residing in each vessel.

The non-transitory, machine readable medium 1900 may also include parameters for the build procedure 1910, which may include initialize manufacturing a three dimensional object with the build material from at least one of the plurality of vessels in response to detecting the moisture content level of the build material residing in the at least one vessel is within a predetermined range.

Other parameters and procedures may also be stored on the non-transitory, machine readable medium 1900. For example, the non-transitory, machine readable medium 1900 may include a material type for a build material in the build material container.

While the present techniques may be susceptible to various modifications and alternative forms, the examples discussed above have been shown by way of example. It is to be understood that the techniques are not intended to be limited to the particular examples disclosed herein. Indeed, the present techniques include all alternatives, modifications, and equivalents falling within the scope of the present techniques.

What is claimed is:

1. A system for manufacturing three dimensional objects, comprising:
    a build material vessel to contain a build material;
    a feeder connected to the build material vessel;
    a humidity sensor;
    a conditioning agent source;
    a controller; and
    a non-transitory storage medium storing instructions that upon execution on the controller cause the controller to:
        determine, based on data from the humidity sensor, a moisture content level of the build material in the build material vessel;
        adjust a humidity level of a gas and a conditioning agent applied to the build material vessel, wherein the humidity level is based on the moisture content level and a temperature of the build material residing in the build material vessel;
        adjust the feeder connected to the build material vessel to dispense the build material into a conduit to carry the build material to a location for dispensing into a build enclosure; and
        initialize manufacturing of a three dimensional object in the build enclosure with the build material from the build material vessel in response to detecting the moisture content level of the build material in the build material vessel is within a predetermined range.

2. The system of claim 1, wherein the instructions upon execution cause the controller to control a valve to adjust an amount of the conditioning agent and the gas entering the build material vessel.

3. The system of claim 1, further comprising a humidity generator connected to the build material vessel to provide the conditioning agent and the gas.

4. The system of claim 1, comprising a storage vessel including a build material stored with a high humidity, and wherein the instructions upon execution cause the controller to control provision of the build material stored with the high humidity to the build material vessel.

5. The system of claim 1, further comprising a humidity generator and a water reservoir to provide water to the humidity generator connected to the build material vessel via a one way conduit, wherein the water reservoir comprises a first water level sensor and the humidity generator comprises a second water level sensor.

6. The system of claim 1, further comprising a fan to circulate exhaust air from a location within the system, wherein the fan is to blow the conditioning agent and the exhaust air through a humidity generator and into the build material vessel.

7. The system of claim 1, further comprising:
    a heat source;
    a heat exchanger having a first side to remove loose build material from the heat source and transfer heat from the heat source to the gas; and
    a fan to blow a heated gas or conditioning agent from a second side of the heat exchanger through a humidity generator and into the build material vessel.

8. The system of claim 1, further comprising a conduit proximate a top of the build material vessel to transport excess vapor from the build material vessel to a location outside of the system.

9. The system of claim 1, further comprising a fan residing proximate a top of the build material vessel to diffuse excess vapor exiting the top of the build material vessel.

10. The system of claim 1, further comprising a conduit proximate a top of the build material vessel to recirculate excess vapor through a fan to a bottom of the build material vessel.

11. The system of claim 1, further comprising a humidity sensor residing proximate a top of the build material vessel to detect a humidity level of excess vapor, wherein the instructions upon execution cause the controller to adjust an amount of the conditioning agent applied to the gas in response to a change in the humidity level of the excess vapor.

12. The system of claim 1, further comprising a humidity generator to provide the conditioning agent and the gas to the build material vessel, the humidity generator comprising a safety overflow feature to prevent the gas with the conditioning agent from escaping through the safety overflow feature into the system.

13. The system of claim 1, further comprising a humidifier to provide a second conditioning agent to a pneumatic air transport line for transporting the build material from the build material vessel to a second vessel or the build enclosure or a transport line operating under gravity.

14. A method for manufacturing three dimensional objects, comprising:
    detecting, based on data from a humidity sensor in a system, a moisture content level corresponding to a build material residing in a build material vessel of the system;
    adjusting a humidity level of a gas and a conditioning agent from a conditioning agent source applied to the build material vessel, wherein the humidity level is based on the moisture content level and a temperature of the build material residing in the build material vessel, wherein a humidity generator connects to the build material vessel to provide the conditioning agent and the gas;
    adjusting, by a controller, a feeder connected to the build material vessel to dispense the build material into a conduit to carry the build material to a location for dispensing into a build enclosure; and
    initializing, by the controller, manufacturing of a three dimensional object in the build enclosure with the build material from the build material vessel in response to detecting the moisture content level of the build material residing in the build material vessel is within a predetermined range.

15. The system of claim 1, wherein the instructions upon execution cause the controller to adjust a temperature of the gas and the conditioning agent applied to the build material vessel, based on the moisture content level and the temperature of the build material residing in the build material vessel.

16. The system of claim 1, further comprising:
    a further humidity sensor to sense a humidity level inside the conduit carrying the build material, wherein the instructions upon execution cause the controller to detect the humidity level inside the conduit based on a measurement of the further humidity sensor, and control adjustment of the humidity level inside the conduit.

17. The method of claim 14, further comprising:
adjusting, by the controller, a temperature of the gas and the conditioning agent applied to the build material vessel, based on the moisture content level and the temperature of the build material residing in the build material vessel.

18. The method of claim 14, further comprising:
detecting, by the controller based on a measurement of a humidity sensor, a humidity level inside the conduit carrying the build material; and
adjusting the humidity level inside the conduit based on the detected humidity level inside the conduit.

19. The system of claim 1, wherein the system is a three-dimensional printer.

\* \* \* \* \*